US012580997B2

(12) United States Patent
Ding et al.

(10) Patent No.: US 12,580,997 B2
(45) Date of Patent: Mar. 17, 2026

(54) MICROSERVICE COMMUNICATION AND COMPUTING OFFLOADING VIA SERVICE MESH

(71) Applicant: Intel Corporation, Santa Clara, CA (US)

(72) Inventors: Zongrui Ding, Portland, OR (US); Qian Li, Portland, OR (US); Xiaopeng Tong, Beijing (CN); Alexandre Saso Stojanovski, Paris (FR); Thomas Luetzenkirchen, Taufkirchen (DE); Sudeep Palat, Gloucestershire (GB); Ching-Yu Liao, Santa Clara, CA (US); Abhijeet Kolekar, Portland, OR (US); Sangeetha L. Bangolae, Santa Clara, CA (US); Youn Hyoung Heo, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/723,345

(22) PCT Filed: Feb. 7, 2023

(86) PCT No.: PCT/US2023/062099
§ 371 (c)(1),
(2) Date: Jun. 21, 2024

(87) PCT Pub. No.: WO2023/154691
PCT Pub. Date: Aug. 17, 2023

(65) Prior Publication Data
US 2025/0071190 A1      Feb. 27, 2025

Related U.S. Application Data

(60) Provisional application No. 63/307,888, filed on Feb. 8, 2022.

(51) Int. Cl.
| | | |
|---|---|---|
| *G06F 15/16* | (2006.01) | |
| *H04L 67/56* | (2022.01) | |
| *H04L 67/61* | (2022.01) | |

(52) U.S. Cl.
CPC .............. *H04L 67/61* (2022.05); *H04L 67/56* (2022.05)

(58) Field of Classification Search
None
See application file for complete search history.

(56) References Cited

U.S. PATENT DOCUMENTS

| | | | |
|---|---|---|---|
| 11,153,412 B1 | 10/2021 | Varadan et al. | |
| 2020/0220848 A1* | 7/2020 | Patwardhan | ........ H04L 41/5041 |

(Continued)

FOREIGN PATENT DOCUMENTS

| | | |
|---|---|---|
| WO | 2022/020770 A1 | 1/2022 |
| WO | 2022/026081 A1 | 2/2022 |

(Continued)

OTHER PUBLICATIONS

International Patent Office—International Search Report and Written Opinion mailed Jun. 2, 2023, from International Patent Application No. PCT/US2023/062099, 9 pages.
3GPP, "Technical Specification Group Services and System Aspects; System architecture for the 5G System (5GS); Stage 2 (Release 17)," 3GPP TS 23.501 V17.3.0 (Dec. 2021), 5G, 559 pages.

(Continued)

*Primary Examiner* — Phuoc H Nguyen
(74) *Attorney, Agent, or Firm* — Schwegman Lundberg & Woessner, P.A.

(57) ABSTRACT

Various embodiments herein provide techniques to enable communication between a user equipment (UE) microservice and a microservice of a wireless cellular network via service mesh. A first solution is described, in which the service mesh is in the network, and the network includes a service mesh proxy to communicate with the UE. A second solution is also described, in which the UE is part of the (Continued)

800 receiving a computing service request from a user equipment (UE), the computing service request including an indication of a service mesh container or information element (IE)
802

↓ encoding a hypertext transfer protocol (HTTP) computing service request message for transmission to a service orchestration control function (SOCF) based on the computing service request from the UE
804 cellular network service mesh and includes a service mesh proxy in the UE. Other embodiments may be described and claimed.

20 Claims, 12 Drawing Sheets

(56) References Cited

U.S. PATENT DOCUMENTS

| | | | | |
|---|---|---|---|---|
| 2021/0014303 A1* | 1/2021 | Guim Bernat | ...... | H04L 41/5019 |
| 2021/0328886 A1* | 10/2021 | Guim Bernat | ...... | H04L 41/5022 |
| 2021/0336936 A1 | 10/2021 | Feng et al. | | |
| 2021/0392477 A1 | 12/2021 | Taft et al. | | |
| 2023/0108209 A1* | 4/2023 | Pilkington | .......... | H04L 67/1012 |
| | | | | 709/217 |
| 2023/0155984 A1* | 5/2023 | Adam | ................... | H04L 63/105 |
| | | | | 726/26 |
| 2024/0121745 A1* | 4/2024 | Ding | .................... | H04W 76/20 |
| 2025/0071190 A1* | 2/2025 | Ding | ....................... | H04L 67/61 |
| 2025/0274744 A1* | 8/2025 | Chatterjee | .......... | H04W 72/231 |

FOREIGN PATENT DOCUMENTS

| | | |
|---|---|---|
| WO | 2023062099 | 4/2023 |
| WO | 2023154691 | 8/2023 |

OTHER PUBLICATIONS

3GPP, "Technical Specification Group Services and System Aspects; Study on Enhancements to the Service-Based Architecture (Release 16)," 3GPP TR 23.742 V16.0.0 (Dec. 2018), 5G, 131 pages.

3GPP, "Technical Specification Group Radio Access Network; NG-RAN; Architecture description (Release 16)," 3GPP TS 38.401 V16.8.0 (Dec. 2021), 5G, 79 pages.

3GPP, "Technical Specification Group Core Network and Terminals; 5G System; Unified Data Management Services; Stage 3 (Release 17)," 3GPP TS 29.503 V17.5.0 (Dec. 2021), 5G, 466 pages.

3GPP, "Technical Specification Group Services and System Aspects; Procedures for the 5G System (5GS); Stage 2 (Release 17)," 3GPP TS 23.502 V17.3.0 (Dec. 2021), 5G, 727 pages.

3GPP, "Technical Specification Group Core Network and Terminals; Non-Access-Stratum (NAS) protocol for 5G System (5GS); Stage 3; (Release 17)," 3GPP TS 24.501 V17.4.0 (Sep. 2021), 5G, 863 pages.

Caulfield, et al., "A Cloud-Scale Acceleration Architecture," Microsoft Corporation, 2016 49th Annual IEEE/ACM International Symposium on Microarchitecture (Micro), DOI: 10.1109/MICRO.2016. 7783710 , Oct. 15-19, 2016.

"International Application Serial No. PCT US2023 062099, International Preliminary Report on Patentability mailed Aug. 22, 2024", 6 pgs.

* cited by examiner

800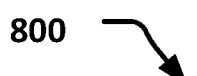

receiving a computing service request from a user equipment (UE), the computing service request including an indication of a service mesh container or information element (IE)

802 encoding a hypertext transfer protocol (HTTP) computing service request message for transmission to a service orchestration control function (SOCF) based on the computing service request from the UE

900 receiving, from a processor circuitry of the UE, a first request for a computing service

902 sending, based on the first request, a second request for the computing service to a service orchestration control function (SOCF)

904 receiving, from the SOCF, a response that includes an identifier associated with the requested computing service

906

1000 receiving, from a service mesh proxy, a request for a computing service for a user equipment (UE)

1002 determining one or more requirements for the computing service based on the request

1004 sending a message to a computing control function (Comp CF) via an evolved service communication proxy (eSCP) to indicate the one or more requirements

1006

MICROSERVICE COMMUNICATION AND COMPUTING OFFLOADING VIA SERVICE MESH

CROSS REFERENCE TO RELATED APPLICATIONS

The present application is a national phase entry under 35 U.S.C. § 371 of International Application No. PCT/US2023/062099, filed Feb. 7, 2023, entitled "MICROSERVICE COMMUNICATION AND COMPUTING OFFLOADING VIA SERVICE MESH," which claims priority under 35 U.S.C. § 119 (e) to U.S. Provisional Patent Application No. 63/307,888, which was filed Feb. 8, 2022, the entire disclosures of which are hereby incorporated by reference.

FIELD

Various embodiments generally may relate to the field of wireless communications. For example, some embodiments may relate to microservice communication and computing offloading via service mesh.

BACKGROUND

A service mesh is a configurable infrastructure layer for microservices applications to facilitate service to service communications. In data centers, service mesh facilitates the microservice communication in the network by handling the communication, security, traffic engineering, etc. aside from the application itself.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 8, 9, and 10 depict example procedures for practicing the various embodiments discussed herein.

DETAILED DESCRIPTION

Figure 1:
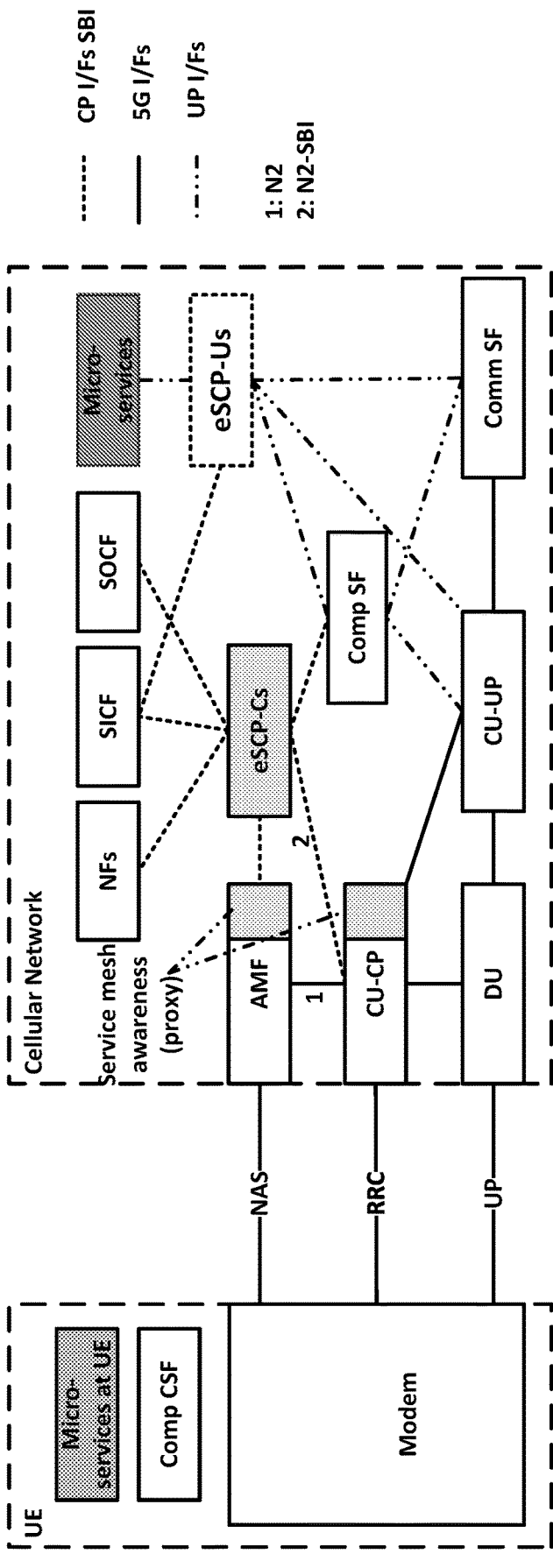
FIG. 1 schematically illustrates a user equipment (UE) and cellular network with service mesh on the network side, in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

As described herein, a service mesh is a configurable infrastructure layer for microservices applications to facilitate service-to-service communications. In data centers, service mesh facilitates the microservice communication in the network by handling the communication, security, traffic engineering, etc. aside from the application itself.

In some embodiments, particularly for a 6G network architecture with further cloudification, a service mesh can provide connectivity among different network functions on control plane as well as service instances on user plane. There are also microservices (e.g., functions, applications, etc.) running on the UE side that need to communicate with the microservices (functions, applications) on the network side. In some embodiments, evolved service communication proxies for control plane (eSCP-Cs) and evolved service communication proxies for user plane (eSCP-Us) are the functions to enable control plane (CP) and user plane (UP) service mesh. Embodiments herein may facilitate the UE sending a request for computing service and leveraging service mesh for CP service negotiation and UP data transfer. For example, aspects of various embodiments may relate to, among other things:

How a UE can leverage the CP service mesh to facilitate the service request process for computing, communication and data services; and How a UE can leverage the UP service mesh to set up data path for the microservice communication between instances on the UE and instances in the network.

In this disclosure, solutions are provided to enable a microservice on a UE to communicate with a microservice in the cellular network using CP service mesh for negotiation and configuration, and UP service mesh for data path. In Solution 1, a cellular network provides a service mesh proxy to facilitate service request for UEs without service mesh proxies. In Solution 2, a UE is capable of service mesh with a Service Mesh (SM) proxy function at the UE side to directly interact with evolved service communication proxies (eSCPs) of the network CP and UP service mesh.

Further details of various solutions to enable a microservice on a UE to communicate with a microservice in the network leveraging service mesh are described further below. For example, the solutions may include:

Solution 1: service mesh only in network

In this solution, UE interacts with a service mesh proxy in the cellular network to perform service discovery, computing offloading and negotiate the connectivity Solution 2: enable UE to participate in the cellular network service mesh with the service mesh proxy at the UE side In this solution, UE is part of the cellular network service mesh and holds the functionality of a service mesh proxy by itself. This solution can facilitate UEs with producer microservices and leverage the native service mesh design at the network side Solution 1: Service Mesh Only in Network This solution applies to the scenario where service mesh is only at the network side, and UE can be service mesh aware or not (e.g., aware but not capable). The 6G network can provide on-demand microservice deployment, service discovery and the infrastructure for communication between a microservice on the UE and a microservice on the network side as shown in FIG. 1. The cellular network may be enhanced with the following:

Service mesh proxy at the network side (e.g., as part of access and mobility management function (AMF) or centralized unit-control plane (CU-CP)) is responsible for requesting related services for UE through service mesh, e.g., translating non-access stratum (NAS)/radio resource control (RRC) messages and related information elements (IEs) to hypertext transfer protocol (HTTP)/remote procedure call (RPC) messages.

The communication bearer can be set up between UE and a communication service function (Comm SF) or UE and a centralized unit-user plane (CU-UP) in the case that computation service function (Comp SF) is collocated with the CU-UP. The CU-UP or the Comm SF is able to identify the destination of the bearer and forward the traffic to the Comp SF.

The Comp SF acts as an ingress and egress gateway for the user plane service mesh which can route the UP traffic to the microservice via eSCP-U.

General Procedure for Communication Between UE Microservice and Network Microservices for Solution 1

Figure 2A:
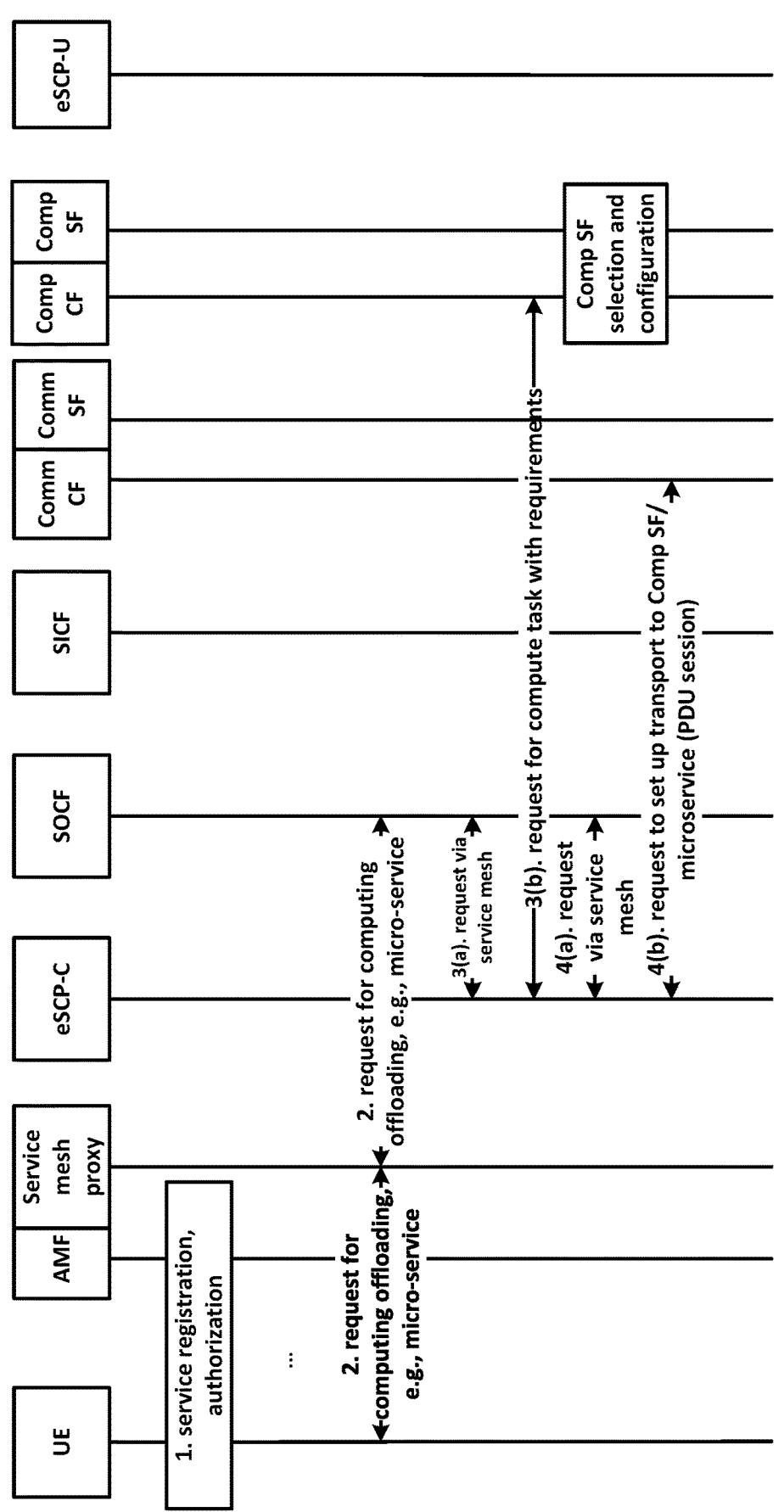
FIGS. 2A and 2B illustrate a procedure for communication between UE microservices and network microservices using a network proxy, in accordance with various embodiments.
Figure 2B:
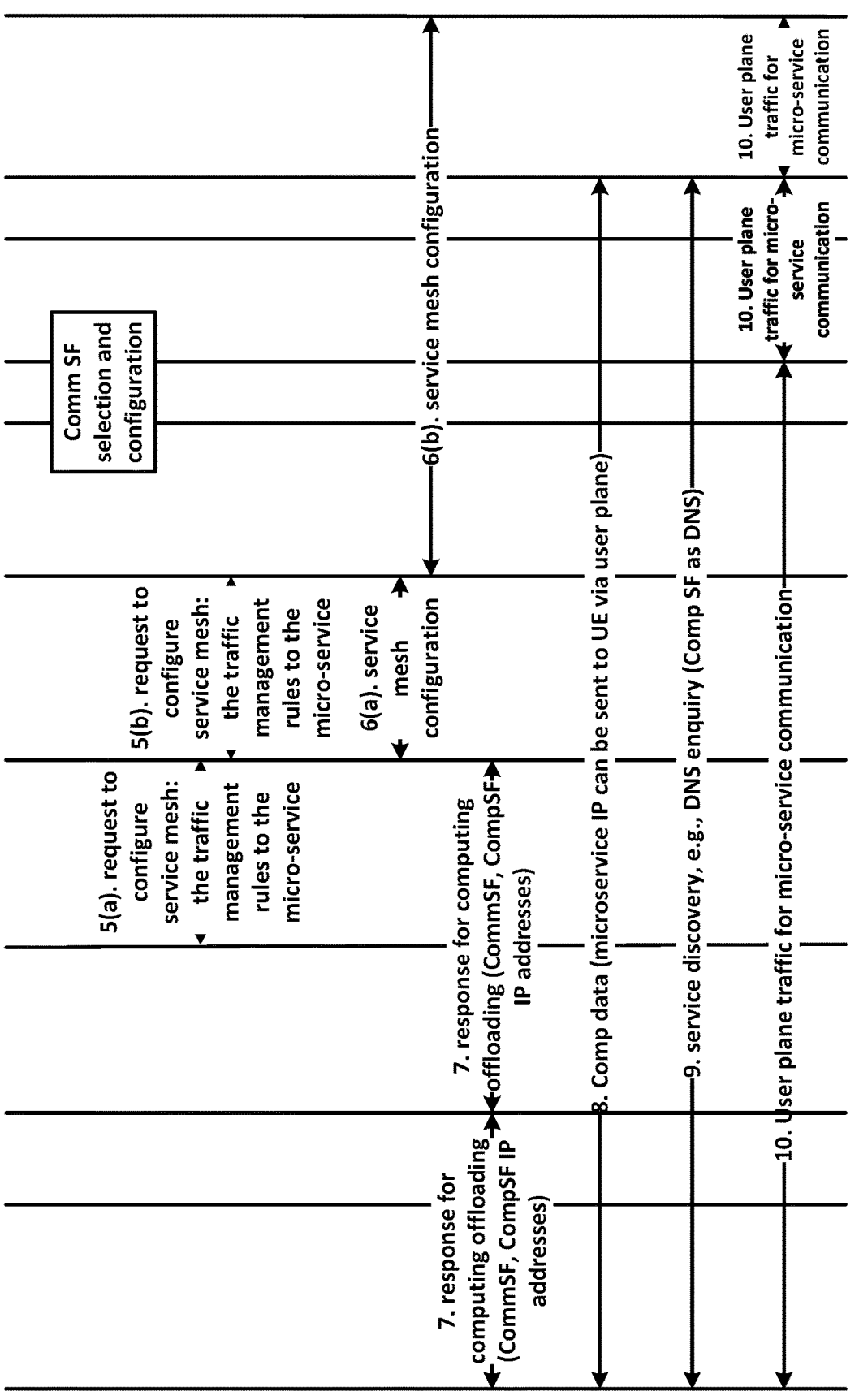

The procedure in FIGS. 2A-2B shows the AMF as the service mesh proxy for UE, which translates a NAS message with service mesh related containers and IEs into an HTTP message. In the case of CU-CP as the service mesh proxy, a RRC message is used instead of a NAS message.

Note: the CP function communicates via eSCP-C which may not be shown explicitly to simplify the message flow. For example, eSCP-C serves as the proxy between AMF and SOCF; SOCF and SICF, SOCF and Comp CF, etc. This also applies to the procedure of FIGS. 4A-4B, which is further discussed below.

The operations of the procedure of FIGS. 2A-2B are further described below.

1) UE registers with the AMF and get authorized for service mesh related services based on similar procedure as defined in TS 23.502, v. 17.3.0, 2021 Dec. 23, Section 4.2.2.2. Per the UE's subscription, the UE is allowed to use the computing service and service mesh provided by the cellular network. This message may include the exchange of a new service indicator for either computing service or service mesh or both. This operation may also involve the selection of an AMF which is capable of acting as a service mesh proxy for the UE. The AMF selection process may involve NRF queries for AMFs with service mesh proxy capabilities or using the existing process such as a GUAMI. Also, a SOCF is assigned upon the authorization of UE's computing service to serve as a frontend. The N2 can be SBI or non-SBI.

2) UE sends a request to SOCF to request for computing service such as a microservice. This message firstly goes to the AMF or CU-CP and then the corresponding service mesh proxy which translates NAS or RRC message (respectively) to HTTP message. This message can include proper identifiers to the microservice, the UE, additional descriptions such as computing resource requirements, software version, data rate, QoS, latency, etc. This message can be a NAS message with a special indicator for SOCF so that the related NAS containers can be carried by a HTTP message to SOCF. The translated HTTP message is sent via CP service mesh through eSCP-C to SOCF. In case of the CU-CP serving as service mesh proxy, a new RRC message or IEs can be defined to carry the information for SOCF. In this case, CU-CP can send the message using a SBI towards SOCF in case of N2 being SBI or going through AMF via N2.

3) SOCF makes decisions about the requirements for computing and sends a request to Comp CF via eSCP-C. Comp CF shall respond with whether these requirements can be fulfilled or not. Based on the requirements for computing, Comp SF can be selected and configured.

4) Similar to Operation 3, SOCF sends the requirements for communication to Comm CF via eSCP-C, which shall respond with whether the requirements can be fulfilled or not and other related information such as identifiers to the allocated Comm SF or PDU session. For example, a PDU/compute session can be established between UE and the selected Comm SF, which can forward traffic to the allocated Comp SF. These forwarding rules can be based on the PDU session context or a packet filter.

5) SOCF sends a request to SICF via eSCP-C to configure the service mesh. This message includes the configuration requirements to the eSCP-Us, e.g., the traffic management rules such as load balancing, access rules, routing rules 6) SICF sends a request to eSCP-Cs and eSCP-Us to configure the service mesh proxies. Then eSCP-C and eSCP-U shall respond with the results of the configuration request. If the requested requirements cannot be fulfilled, reasons of the failure may be included. SICF can query an NRF for the targeted eSCP-Us or leverage a service mesh function repository maintained by SICF.

7) SOCF sends a response to the UE via the service mesh proxy, e.g., AMF/CU-CP. This message goes from SOCF to AMF (or CU-CP) via eSCP-C, which is translated into NAS/RRC message. If the request is sent in the form of a NAS message, the response shall be NAS message. This response may include the identifiers to the assigned Comm SF, Comp SF or microservice. The identifiers can be IP address: port number, FQDN, S-NSSAI, DNN, URLs, etc.

8) The computing data can be sent to the assigned Comp SF via user plane. For example, the computing data can be the metadata, software program, files, data, scripts.

Particularly, UE's requested microservice's IP address: port number can be sent to UE via user plane.

9) [Optional] UE may perform service discovery. For example, UE can send a DNS request on its requested microservice to its assigned Comp SF. The Comp SF will then serve as a DNS server to return the IP address: port number of the UE's requested microservice or its eSCP-U.

10) The communication between microservice on the UE and the microservice in the cellular network is ready. UE can send data to the Comm SF, then the Comp SF and then eSCP-U and then the microservice instance.

Solution 2: Enable Uu Interface as SBI to Extend Service Mesh to UE

Figure 3:
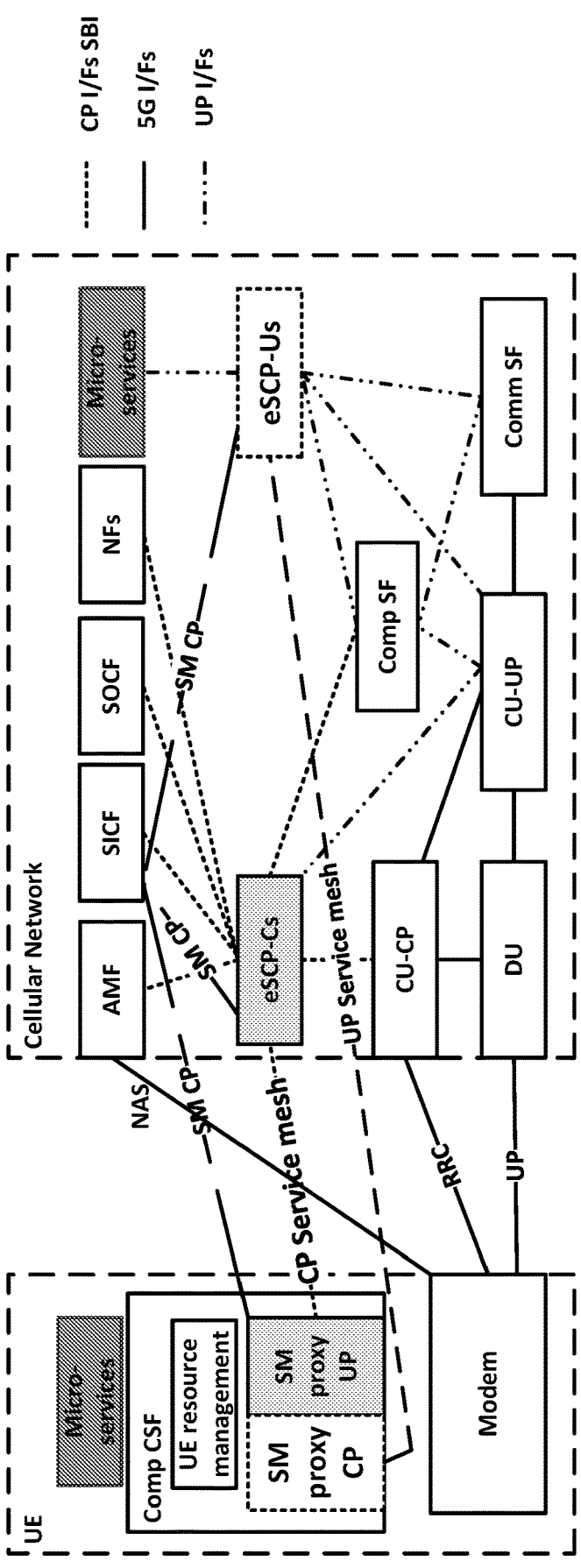
FIG. 3 schematically illustrates a UE and a cellular network, with a service based interface (SBI) enabled Uu interface to form a service mesh between the UE and the network, in accordance with various embodiments.

In this solution, the UE is capable of a service mesh, meaning that a function serving as a service mesh proxy is at the UE side. In one example, the service mesh proxy is named SM proxy and shown in FIG. 3. It is implementation specific whether one service mesh proxy is used to service all the applications or multiple proxies to service multiple microservices. The SM proxy is a function at the UE side to serve as a counterpart of eSCPs at the network side. The SM proxy includes CP and UP functions which logically connect to the eSCP-C and eSCP-U, respectively, in the cellular network to form the CP service mesh and the UP service mesh.

SICF configures the eSCPs as well as the SM proxy on the UE side. There is a logical interface between SICF and the SM proxy on UE. This also indicates there is new SBI between UE and NW for CP.

The producer applications on UE are discoverable by the network microservices in the service mesh. Service discovery approach is similar to the service discovery in a cloud native service mesh At UE side, the Client Service Function (CSF) can be implemented by a resource management function and the service mesh proxy. The UE resource management function shall monitor the UE's local computing resource and the network computing resource and make decisions about whether to use local or remote resource for a compute task, e.g., running a microservice instance.

General Procedure for Communication Between UE Microservice and Network Microservices for Solution 2

Figure 4A:
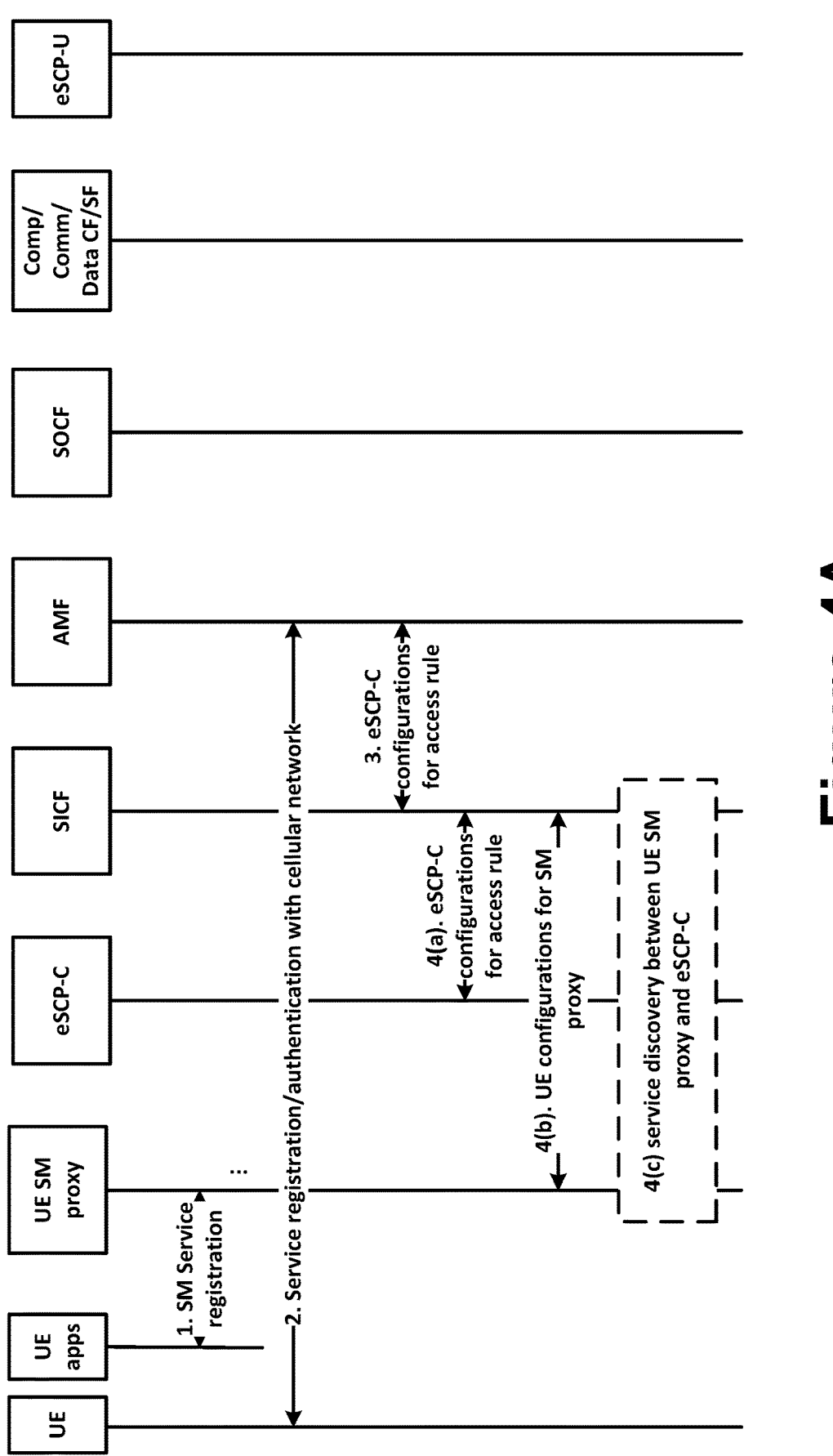
FIGS. 4A and 4B illustrate a procedure for microservices on the UE to communicate with the microservice in the cellular network with Uu interface as a SBI, in accordance with various embodiments.
Figure 4B:
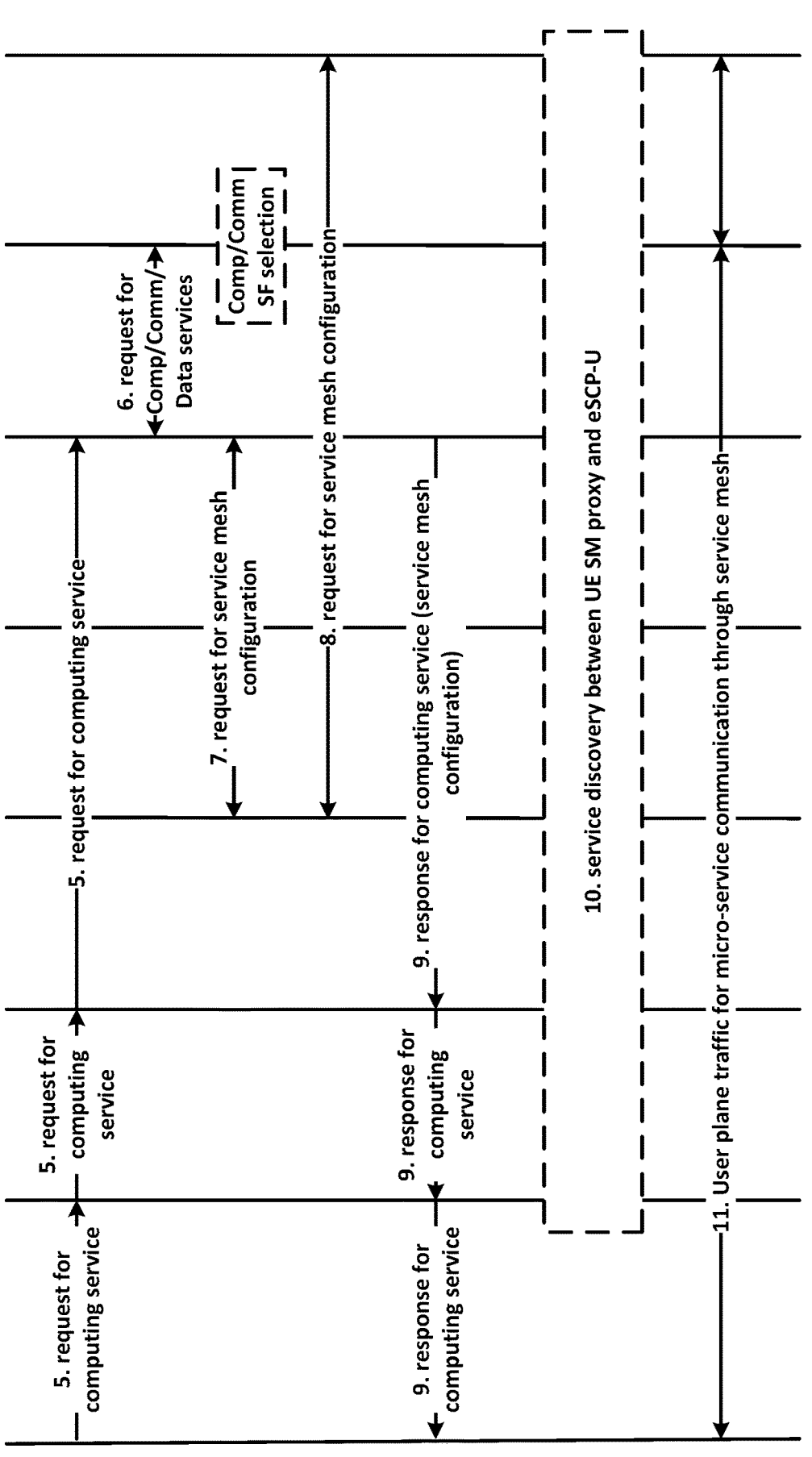

FIGS. 4A and 4B illustrate an example procedure in accordance with Solution 2. The operations of the procedure of FIGS. 4A-4B are further described below.

1) UE applications register with the UE SM proxy. This operation can happen upon an application instance capable of service mesh is up and running. This operation may be optional. By registration, UE SM proxy can maintain a repository about the applications running on UE.

2) UE registers with the AMF and gets authorized for service mesh related services based on similar procedure as defined in TS 23.502 Section 4.2.2.2. Based on UE's subscription, UE is allowed to use the computing service and service mesh for both CP and UP provided by the cellular network. This message may include the exchange of new service indicators for either computing service or service mesh for CP or UP or all. This message also includes UE's service mesh capabilities, e.g., UE can support service mesh and has a SM proxy. More detailed information can be included about the SM proxy such as publisher, software version, etc. Also, a SOCF is assigned upon the authorization of UE's computing service to serve as a frontend. A security context can also be created which can be used in Operation 4(b).

3) Upon UE registration/authorization with AMF, AMF sends a request to SICF to configure the eSCP-C on the network side and the SM proxy on the UE side. This message may include the UE's access and traffic management rules to eSCP-Cs.

a. In one example, the eSCP-C can be configured to allow or bar an application/UE from sending service request to the SOCF. These identifiers can include different forms of UE IDs, PDU session IDs, application IDs, network IDs such as DNN, S-NSSAI, etc.

b. In another example, the eSCP-C can be configured to load balancing the traffic from a UE to different SOCFs or other NFs (e.g., NWDAF) based on the S-NSSAI, application identifier, keywords in the request URL, etc. This request may also include a query for the configurations to UE's SM proxy about the URLs for requesting different services, security credentials, other identifiers such as IP address: port numbers to access different services. SICF shall include the requested information in the response of the request. This response happens after SICF get a result from the requested configurations to the eSCPs in Operation 4.

4) SICF sends a request to eSCP-Cs and UE's SM proxy for configurations based on the request from AMF.

a. SICF sends request to eSCP-Cs to configure the access and traffic management rules, security, etc. as described in Operation 3. eSCP-C shall send a response to confirm whether the configuration is successful or not.

b. SICF sends request to UE's SM proxy to configure the access and traffic management rules, security related information as described in Operation 3. SM proxy shall send a response to confirm whether the configuration is successful or not. In some embodiments, the SICF request to configure UE SM proxy may be in one of the following forms:

i. SICF may send a request to AMF to send the configuration information as a separate NAS message or a combined NAS message with the registration response to UE in Operation 2.

ii. SICF may send a request to AMF to send the configuration information as part of the UE's UE Route Selection Policy (URSP).

c. [Optional] service discovery can be performed between UE SM proxy and eSCP-C based on different service discovery mechanisms.

5) UE sends a request to SOCF to request for computing service such as a microservice. This message can include proper identifiers to the microservice, the UE, additional descriptions such as computing resource requirements, software version, data rate, QoS, latency, etc. This message is a HTTP message, which goes through UE's SM proxy, the air interface transport to the eSCP-C, further to the SOCF.

6) SOCF generates the requirements for computing, communication and data planes and request for different services to set up computing task, communication bearer such as PDU session, required data. Comp SF, Comm SF and DSF may be assigned to serve UE's request.

7) SOCF sends a request to SICF to configure the UP service mesh. This message may include the following:

a. identifiers of the assigned Comp SF, Comm SF and DSF, which can help SICF to decide the eSCP-Us related to UE's service requests.

b. The traffic management rules for UE's application or microservice such as load balancing, access and routing rules, monitoring and telemetry rules c. The identifiers to the requested microservice which may be used to do identifier mapping to the microservice instance across different domains.

SICF shall respond with the whether the configuration is successful or not.

8) SICF sends a request to the eSCP-U to configure the UP service mesh. This message may include the following a. The identifiers to the eSCP-Us, Comp SF, UE, microservices b. the traffic management rules such as access, load balancing, traffic filters, etc.

c. The rules for monitoring, statistics, and telemetry

9) SOCF shall respond the service request to the UE through CP service mesh. This message is also a HTTP message with the information such as the identifiers to the requested computing service, Comp SF's identifier such as IP address: port number, additional identifiers and service context for RAN 10) There may be additional service discovery procedure between the eSCP-U and UE's SM proxy.

11) UE's microservice can communicate with the requested microservice in the cellular network using the UP service mesh.

Systems and Implementations

Figure 5:
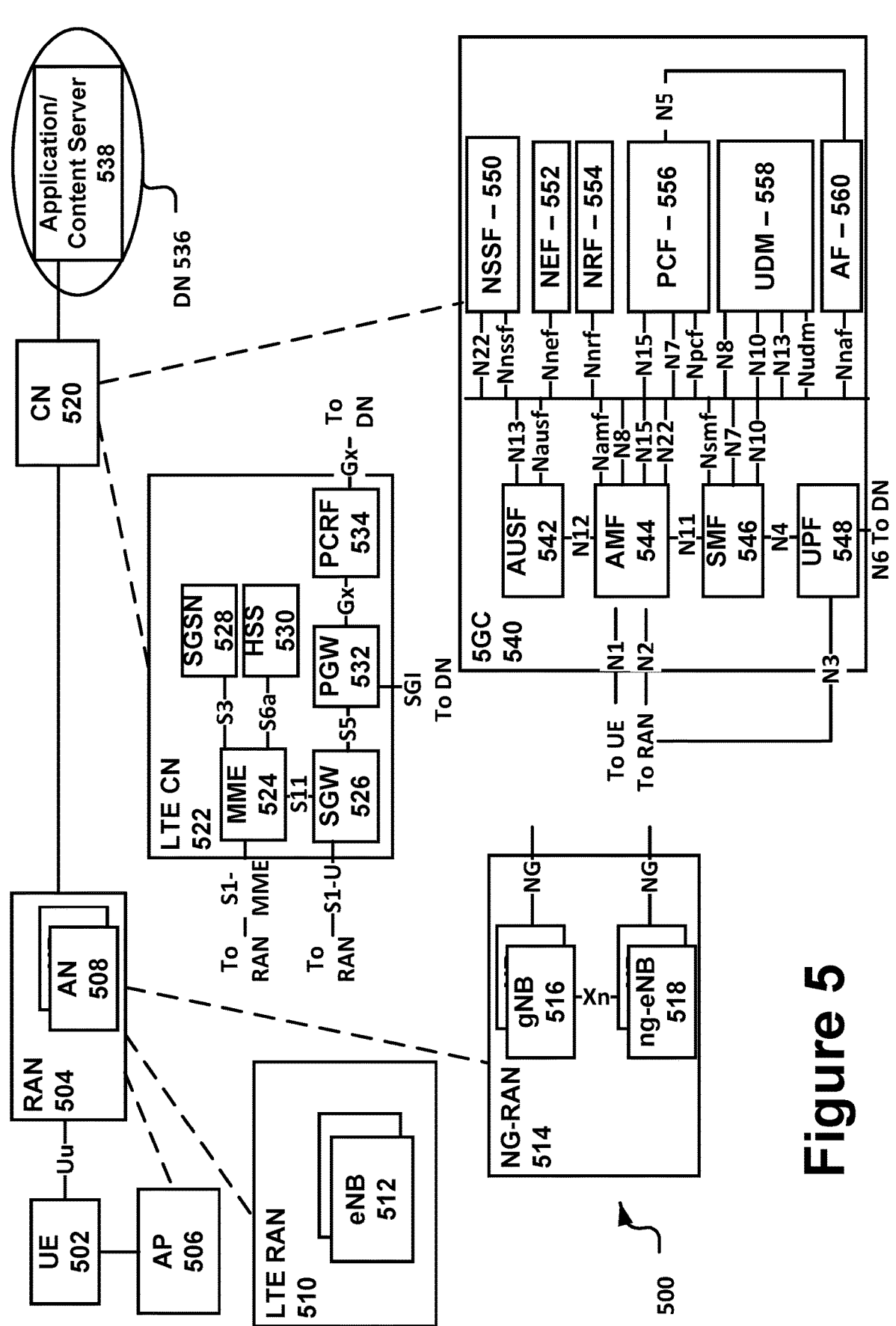
FIG. 5 schematically illustrates a wireless network in accordance with various embodiments.
Figure 6:
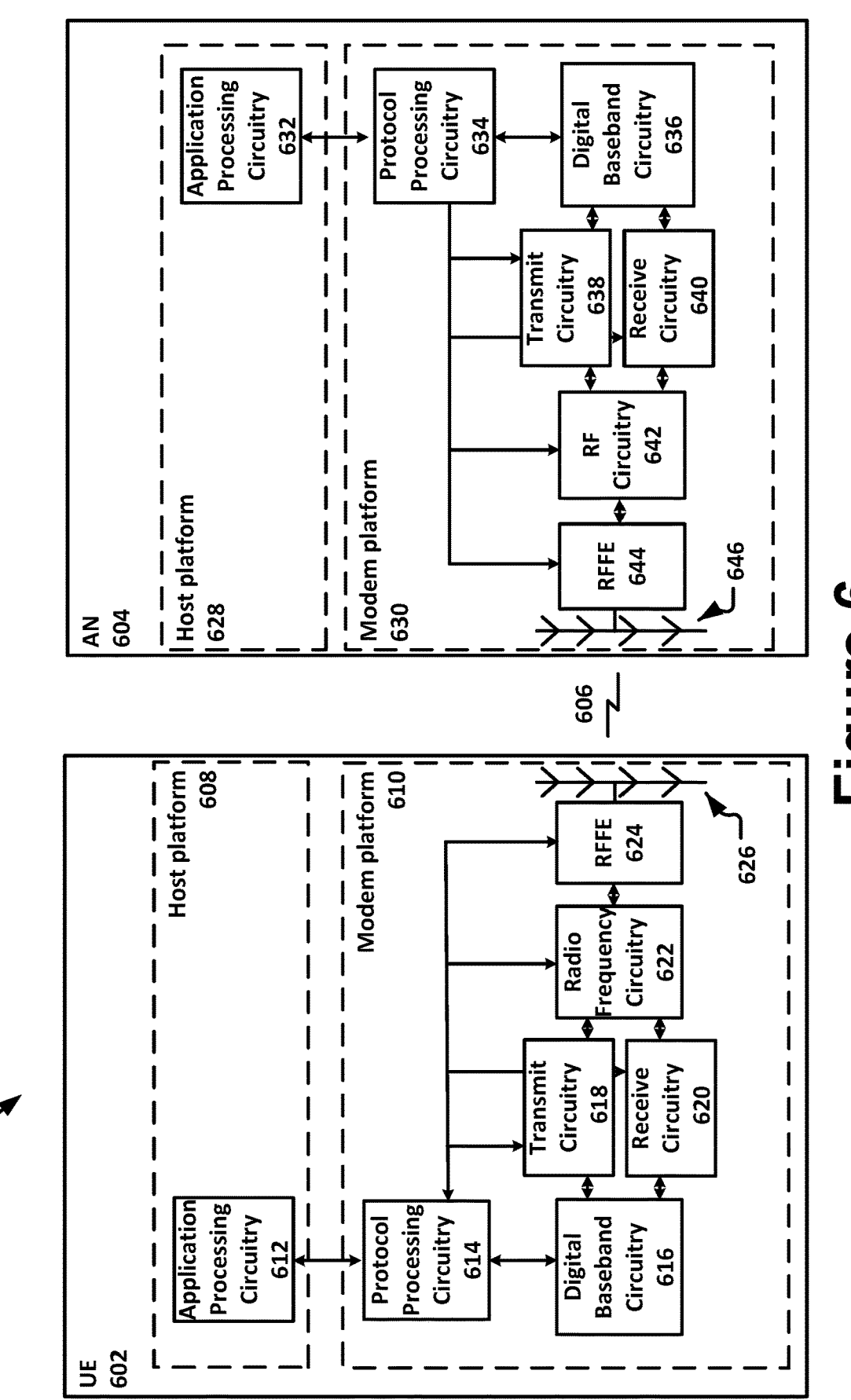
FIG. 6 schematically illustrates components of a wireless network in accordance with various embodiments.
Figure 7:
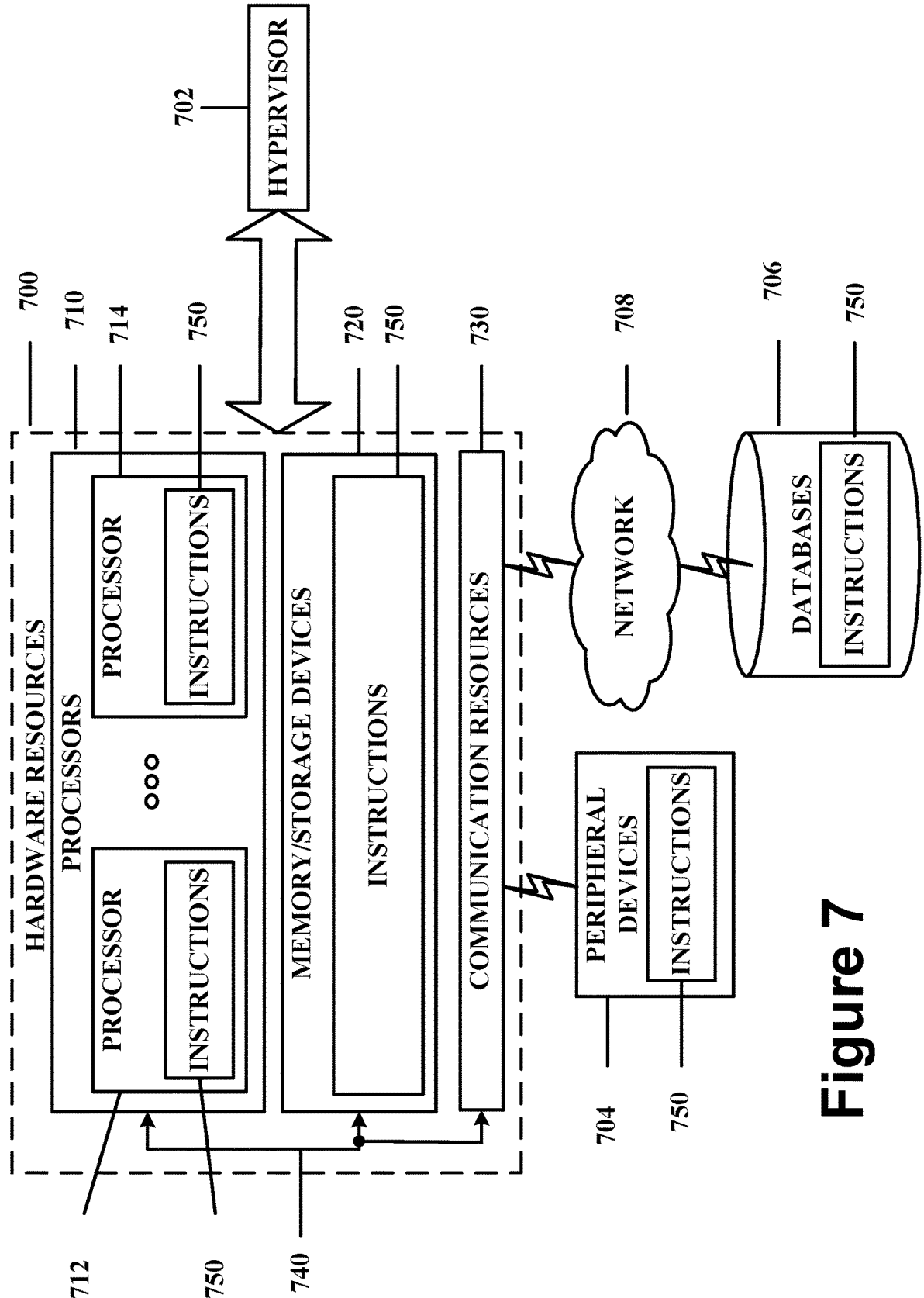
FIG. 7 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 5-7 illustrate various systems, devices, and components that may implement aspects of disclosed embodiments.

FIG. 5 illustrates a network 500 in accordance with various embodiments. The network 500 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 500 may include a UE 502, which may include any mobile or non-mobile computing device designed to communicate with a RAN 504 via an over-the-air connection. The UE 502 may be communicatively coupled with the RAN 504 by a Uu interface. The UE 502 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 500 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 502 may additionally communicate with an AP 506 via an over-the-air connection. The AP 506 may manage a WLAN connection, which may serve to offload some/all network traffic from the RAN 504. The connection between the UE 502 and the AP 506 may be consistent with any IEEE 802.11 protocol, wherein the AP 506 could be a wireless fidelity (Wi-Fi®) router. In some embodiments, the UE 502, RAN 504, and AP 506 may utilize cellular-WLAN aggregation (for example, LWA/LWIP). Cellular-WLAN aggregation may involve the UE 502 being configured by the RAN 504 to utilize both cellular radio resources and WLAN resources.

The RAN 504 may include one or more access nodes, for example, AN 508. AN 508 may terminate air-interface protocols for the UE 502 by providing access stratum protocols including RRC, PDCP, RLC, MAC, and LI protocols. In this manner, the AN 508 may enable data/voice connectivity between CN 520 and the UE 502. In some embodiments, the AN 508 may be implemented in a discrete device or as one or more software entities running on server computers as part of, for example, a virtual network, which may be referred to as a CRAN or virtual baseband unit pool. The AN 508 be referred to as a BS, gNB, RAN node, eNB, ng-eNB, NodeB, RSU, TRxP, TRP, etc. The AN 508 may be a macrocell base station or a low power base station for providing femtocells, picocells or other like cells having smaller coverage areas, smaller user capacity, or higher bandwidth compared to macrocells.

In embodiments in which the RAN 504 includes a plurality of ANs, they may be coupled with one another via an X2 interface (if the RAN 504 is an LTE RAN) or an Xn interface (if the RAN 504 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 504 may each manage one or more cells, cell groups, component carriers, etc. to provide the UE 502 with an air interface for network access. The UE 502 may be simultaneously connected with a plurality of cells provided by the same or different ANs of the RAN 504. For example, the UE 502 and RAN 504 may use carrier aggregation to allow the UE 502 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 504 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 502 or AN 508 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 504 may be an LTE RAN 510 with eNBs, for example, eNB 512. The LTE RAN 510 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 504 may be an NG-RAN 514 with gNBs, for example, gNB 516, or ng-eNBs, for example, ng-eNB 518. The gNB 516 may connect with 5G-enabled UEs using a 5G NR interface. The gNB 516 may connect with a 5G core through an NG interface, which may include an N2 interface or an N3 interface. The ng-eNB 518 may also connect with the 5G core through an NG interface, but may connect with a UE via an LTE air interface. The gNB 516 and the ng-eNB 518 may connect with each other over an Xn interface.

In some embodiments, the NG interface may be split into two parts, an NG user plane (NG-U) interface, which carries traffic data between the nodes of the NG-RAN 514 and a UPF 548 (e.g., N3 interface), and an NG control plane (NG-C) interface, which is a signaling interface between the nodes of the NG-RAN 514 and an AMF 544 (e.g., N2 interface).

The NG-RAN 514 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 502 can be configured with multiple BWPs where each BWP configuration has a different SCS. When a BWP configuration is indicated to the UE 502, the SCS of the transmission is changed as well. Another use case example of BWP is related to power saving. In particular, multiple BWPs can be configured for the UE 502 with different amount of frequency resources (for example, PRBs) to support data transmission under different traffic loading scenarios. A BWP containing a smaller number of PRBs can be used for data transmission with small traffic load while allowing power saving at the UE 502 and in some cases at the gNB 516. A BWP containing a larger number of PRBs can be used for scenarios with higher traffic load.

The RAN 504 is communicatively coupled to CN 520 that includes network elements to provide various functions to support data and telecommunications services to customers/subscribers (for example, users of UE 502). The components of the CN 520 may be implemented in one physical node or separate physical nodes. In some embodiments, NFV may be utilized to virtualize any or all of the functions provided by the network elements of the CN 520 onto physical compute/storage resources in servers, switches, etc. A logical instantiation of the CN 520 may be referred to as a network slice, and a logical instantiation of a portion of the CN 520 may be referred to as a network sub-slice.

In some embodiments, the CN 520 may be an LTE CN 522, which may also be referred to as an EPC. The LTE CN 522 may include MME 524, SGW 526, SGSN 528, HSS 530, PGW 532, and PCRF 534 coupled with one another over interfaces (or "reference points") as shown. Functions of the elements of the LTE CN 522 may be briefly introduced as follows.

The MME 524 may implement mobility management functions to track a current location of the UE 502 to facilitate paging, bearer activation/deactivation, handovers, gateway selection, authentication, etc.

The SGW 526 may terminate an SI interface toward the RAN and route data packets between the RAN and the LTE CN 522. The SGW 526 may be a local mobility anchor point for inter-RAN node handovers and also may provide an anchor for inter-3GPP mobility. Other responsibilities may include lawful intercept, charging, and some policy enforcement.

The SGSN 528 may track a location of the UE 502 and perform security functions and access control. In addition, the SGSN 528 may perform inter-EPC node signaling for mobility between different RAT networks; PDN and S-GW selection as specified by MME 524; MME selection for handovers; etc. The S3 reference point between the MME 524 and the SGSN 528 may enable user and bearer information exchange for inter-3GPP access network mobility in idle/active states.

The HSS 530 may include a database for network users, including subscription-related information to support the network entities' handling of communication sessions. The HSS 530 can provide support for routing/roaming, authentication, authorization, naming/addressing resolution, location dependencies, etc. An S6a reference point between the HSS 530 and the MME 524 may enable transfer of subscription and authentication data for authenticating/authorizing user access to the LTE CN 520.

The PGW 532 may terminate an SGi interface toward a data network (DN) 536 that may include an application/content server 538. The PGW 532 may route data packets between the LTE CN 522 and the data network 536. The PGW 532 may be coupled with the SGW 526 by an S5 reference point to facilitate user plane tunneling and tunnel management. The PGW 532 may further include a node for policy enforcement and charging data collection (for example, PCEF). Additionally, the SGi reference point between the PGW 532 and the data network 5 36 may be an operator external public, a private PDN, or an intra-operator packet data network, for example, for provision of IMS services. The PGW 532 may be coupled with a PCRF 534 via a Gx reference point.

The PCRF 534 is the policy and charging control element of the LTE CN 522. The PCRF 534 may be communicatively coupled to the app/content server 538 to determine appropriate QoS and charging parameters for service flows. The PCRF 532 may provision associated rules into a PCEF (via Gx reference point) with appropriate TFT and QCI.

In some embodiments, the CN 520 may be a 5GC 540. The 5GC 540 may include an AUSF 542, AMF 544, SMF 546, UPF 548, NSSF 550, NEF 552, NRF 554, PCF 556, UDM 558, and AF 560 coupled with one another over interfaces (or "reference points") as shown. Functions of the elements of the 5GC 540 may be briefly introduced as follows.

The AUSF 542 may store data for authentication of UE 502 and handle authentication-related functionality. The AUSF 542 may facilitate a common authentication framework for various access types. In addition to communicating with other elements of the 5GC 540 over reference points as shown, the AUSF 542 may exhibit an Nausf service-based interface.

The AMF 544 may allow other functions of the 5GC 540 to communicate with the UE 502 and the RAN 504 and to subscribe to notifications about mobility events with respect to the UE 502. The AMF 544 may be responsible for registration management (for example, for registering UE 502), connection management, reachability management, mobility management, lawful interception of AMF-related events, and access authentication and authorization. The AMF 544 may provide transport for SM messages between the UE 502 and the SMF 546, and act as a transparent proxy for routing SM messages. AMF 544 may also provide transport for SMS messages between UE 502 and an SMSF. AMF 544 may interact with the AUSF 542 and the UE 502 to perform various security anchor and context management functions. Furthermore, AMF 544 may be a termination point of a RAN CP interface, which may include or be an N2 reference point between the RAN 504 and the AMF 544; and the AMF 544 may be a termination point of NAS (N1) signaling, and perform NAS ciphering and integrity protection. AMF 544 may also support NAS signaling with the UE 502 over an N3 IWF interface.

The SMF 546 may be responsible for SM (for example, session establishment, tunnel management between UPF 548 and AN 508); UE IP address allocation and management (including optional authorization); selection and control of UP function; configuring traffic steering at UPF 548 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 544 over N2 to AN 508; and determining SSC mode of a session. SM may refer to management of a PDU session, and a PDU session or "session" may refer to a PDU connectivity service that provides or enables the exchange of PDUs between the UE 502 and the data network 536.

The UPF 548 may act as an anchor point for intra-RAT and inter-RAT mobility, an external PDU session point of interconnect to data network 536, and a branching point to support multi-homed PDU session. The UPF 548 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 548 may include an uplink classifier to support routing traffic flows to a data network.

The NSSF 550 may select a set of network slice instances serving the UE 502. The NSSF 550 may also determine allowed NSSAI and the mapping to the subscribed S-NS-SAIs, if needed. The NSSF 550 may also determine the AMF set to be used to serve the UE 502, or a list of candidate AMFs based on a suitable configuration and possibly by querying the NRF 554. The selection of a set of network slice instances for the UE 502 may be triggered by the AMF 544 with which the UE 502 is registered by interacting with the NSSF 550, which may lead to a change of AMF. The NSSF 550 may interact with the AMF 544 via an N22 reference point; and may communicate with another NSSF in a visited network via an N31 reference point (not shown). Additionally, the NSSF 550 may exhibit an Nnssf service-based interface.

The NEF 552 may securely expose services and capabilities provided by 3GPP network functions for third party, internal exposure/re-exposure, AFs (e.g., AF 560), edge computing or fog computing systems, etc. In such embodiments, the NEF 552 may authenticate, authorize, or throttle the AFs. NEF 552 may also translate information exchanged with the AF 560 and information exchanged with internal network functions. For example, the NEF 552 may translate between an AF-Service-Identifier and an internal 5GC information. NEF 552 may also receive information from other NFs based on exposed capabilities of other NFs. This information may be stored at the NEF 552 as structured data, or at a data storage NF using standardized interfaces. The stored information can then be re-exposed by the NEF 552 to other NFs and AFs, or used for other purposes such as analytics. Additionally, the NEF 552 may exhibit an Nnef service-based interface.

The NRF 554 may support service discovery functions, receive NF discovery requests from NF instances, and provide the information of the discovered NF instances to the NF instances. NRF 554 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 554 may exhibit the Nnrf service-based interface.

The PCF 556 may provide policy rules to control plane functions to enforce them, and may also support unified policy framework to govern network behavior. The PCF 556 may also implement a front end to access subscription information relevant for policy decisions in a UDR of the UDM 558. In addition to communicating with functions over reference points as shown, the PCF 556 exhibit an Npcf service-based interface.

The UDM 558 may handle subscription-related information to support the network entities' handling of communication sessions, and may store subscription data of UE 502. For example, subscription data may be communicated via an N8 reference point between the UDM 558 and the AMF 544. The UDM 558 may include two parts, an application front end and a UDR. The UDR may store subscription data and policy data for the UDM 558 and the PCF 556, and/or structured data for exposure and application data (including PFDs for application detection, application request information for multiple UEs 502) for the NEF 552. The Nudr service-based interface may be exhibited by the UDR 221 to allow the UDM 558, PCF 556, and NEF 552 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 558 may exhibit the Nudm service-based interface.

The AF 560 may provide application influence on traffic routing, provide access to NEF, and interact with the policy framework for policy control.

In some embodiments, the 5GC 540 may enable edge computing by selecting operator/$3^{rd}$ party services to be geographically close to a point that the UE 502 is attached to the network. This may reduce latency and load on the network. To provide edge-computing implementations, the 5GC 540 may select a UPF 548 close to the UE 502 and execute traffic steering from the UPF 548 to data network 536 via the N6 interface. This may be based on the UE subscription data, UE location, and information provided by the AF 560. In this way, the AF 560 may influence UPF (re)selection and traffic routing. Based on operator deployment, when AF 560 is considered to be a trusted entity, the network operator may permit AF 560 to interact directly with relevant NFs. Additionally, the AF 560 may exhibit an Naf service-based interface.

The data network 536 may represent various network operator services, Internet access, or third party services that may be provided by one or more servers including, for example, application/content server 538.

FIG. 6 schematically illustrates a wireless network 600 in accordance with various embodiments. The wireless network 600 may include a UE 602 in wireless communication with an AN 604. The UE 602 and AN 604 may be similar to, and substantially interchangeable with, like-named components described elsewhere herein.

The UE 602 may be communicatively coupled with the AN 604 via connection 606. The connection 606 is illustrated as an air interface to enable communicative coupling, and can be consistent with cellular communications protocols such as an LTE protocol or a 5G NR protocol operating at mm Wave or sub-6 GHz frequencies.

The UE 602 may include a host platform 608 coupled with a modem platform 610. The host platform 608 may include application processing circuitry 612, which may be coupled with protocol processing circuitry 614 of the modem platform 610. The application processing circuitry 612 may run various applications for the UE 602 that source/sink application data. The application processing circuitry 612 may further implement one or more layer operations to transmit/receive application data to/from a data network. These layer operations may include transport (for example UDP) and Internet (for example, IP) operations The protocol processing circuitry 614 may implement one or more of layer operations to facilitate transmission or reception of data over the connection 606. The layer operations implemented by the protocol processing circuitry 614 may include, for example, MAC, RLC, PDCP, RRC and NAS operations.

The modem platform 610 may further include digital baseband circuitry 616 that may implement one or more layer operations that are "below" layer operations performed by the protocol processing circuitry 614 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 610 may further include transmit circuitry 618, receive circuitry 620, RF circuitry 622, and RF front end (RFFE) 624, which may include or connect to one or more antenna panels 626. Briefly, the transmit circuitry 618 may include a digital-to-analog converter, mixer, intermediate frequency (IF) components, etc.; the receive circuitry 620 may include an analog-to-digital converter, mixer, IF components, etc.; the RF circuitry 622 may include a low-noise amplifier, a power amplifier, power tracking components, etc.; RFFE 624 may include filters (for example, surface/bulk acoustic wave filters), switches, antenna tuners, beamforming components (for example, phase-array antenna components), etc. The selection and arrangement of the components of the transmit circuitry 618, receive circuitry 620, RF circuitry 622, RFFE 624, and antenna panels 626 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 614 may include one or more instances of control circuitry (not shown) to provide control functions for the transmit/receive components.

A UE reception may be established by and via the antenna panels 626, RFFE 624, RF circuitry 622, receive circuitry 620, digital baseband circuitry 616, and protocol processing circuitry 614. In some embodiments, the antenna panels 626 may receive a transmission from the AN 604 by receive-beamforming signals received by a plurality of antennas/antenna elements of the one or more antenna panels 626.

A UE transmission may be established by and via the protocol processing circuitry 614, digital baseband circuitry 616, transmit circuitry 618, RF circuitry 622, RFFE 624, and antenna panels 626. In some embodiments, the transmit components of the UE 604 may apply a spatial filter to the data to be transmitted to form a transmit beam emitted by the antenna elements of the antenna panels 626.

Similar to the UE 602, the AN 604 may include a host platform 628 coupled with a modem platform 630. The host platform 628 may include application processing circuitry 632 coupled with protocol processing circuitry 634 of the modem platform 630. The modem platform may further include digital baseband circuitry 636, transmit circuitry 638, receive circuitry 640, RF circuitry 642, RFFE circuitry 644, and antenna panels 646. The components of the AN 604 may be similar to and substantially interchangeable with like-named components of the UE 602. In addition to performing data transmission/reception as described above, the components of the AN 608 may perform various logical functions that include, for example, RNC functions such as radio bearer management, uplink and downlink dynamic radio resource management, and data packet scheduling.

FIG. 7 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740 or other interface circuitry. For embodiments where node virtualization (e.g., NFV) is utilized, a hypervisor 702 may be executed to provide an execution environment for one or more network slices/sub-slices to utilize the hardware resources 700.

The processors 710 may include, for example, a processor 712 and a processor 714. The processors 710 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 720 may include main memory, disk storage, or any suitable combination thereof. The memory/storage devices 720 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 730 may include interconnection or network interface controllers, components, or other suitable devices to communicate with one or more peripheral devices 704 or one or more databases 706 or other network elements via a network 708. For example, the communication resources 730 may include wired communication components (e.g., for coupling via USB, Ethernet, etc.), cellular communication components, NFC components, Bluetooth® (or Bluetooth® Low Energy) components, Wi-Fi® components, and other communication components.

Instructions 750 may comprise software, a program, an application, an applet, an app, or other executable code for causing at least any of the processors 710 to perform any one or more of the methodologies discussed herein. The instructions 750 may reside, completely or partially, within at least one of the processors 710 (e.g., within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

Example Procedures

In some embodiments, the electronic device(s), network(s), system(s), chip(s) or component(s), or portions or implementations thereof, of FIGS. 5-7, or some other figure herein, may be configured to perform one or more processes, techniques, or methods as described herein, or portions thereof. One such process 800 is depicted in FIG. 8. In some embodiments, the process 800 may be performed by a service mesh proxy, e.g., of a wireless cellular network. At 802, the process 800 may include receiving a computing service request from a user equipment (UE), the computing service request including an indication of a service mesh container or information element (IE). At 804, the process 800 may further include encoding a hypertext transfer protocol (HTTP) computing service request message for transmission to a service orchestration control function (SOCF) based on the computing service request from the UE.

Figure 9:
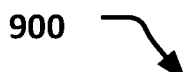

FIG. 9 illustrates another example process 900 in accordance with various embodiments. In some embodiments, the process 900 may be performed by a service mesh proxy, e.g., of a UE. At 902, the process 900 may include receiving, from a processor circuitry of the UE, a first request for a computing service. At 904, the process 900 may further include sending, based on the first request, a second request for the computing service to a service orchestration control function (SOCF). At 906, the process 900 may further include receiving, from the SOCF, a response that includes an identifier associated with the requested computing service.

Figure 10:
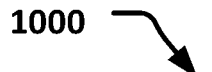

FIG. 10 illustrates another example process 1000 in accordance with various embodiments. In some embodiments, the process 1000 may be performed by a SOCF or a portion thereof. At 1002, the process 1000 may include receiving, from a service mesh proxy, a request for a computing service for a user equipment (UE). At 1004, the process 1000 may further include determining one or more requirements for the computing service based on the request. At 1006, the process 1000 may further include sending a message to a computing control function (Comp CF) via an evolved service communication proxy (eSCP) to indicate the one or more requirements.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Some non-limiting examples of various embodiments are provided below.

Example 1 includes one or more non-transitory computer-readable media having instructions, stored thereon, that when executed by a service mesh proxy, configure the service mesh proxy to: receive a computing service request from a user equipment (UE), the computing service request including an indication of a service mesh container or information element (IE); and encode a hypertext transfer protocol (HTTP) computing service request message for transmission to a service orchestration control function (SOCF) based on the computing service request from the UE.

Example 2 includes the one or more NTCRM of example 1, wherein the HTTP computing service request message includes an indication of: a computing resource requirement, a software version, a data rate, a quality-of-service (QoS) parameter, or a latency.

Example 3 includes the one or more NTCRM of example 1, wherein the service mesh proxy is implemented by an access and mobility management function (AMF).

Example 4 includes the one or more NTCRM of example 3, wherein the computing service request from the UE is received via a non-access stratum (NAS) message.

Example 5 includes the one or more NTCRM of example 1, wherein the service mesh proxy is implemented by centralized unit-control plane (CU-CP).

Example 6 includes the one or more NTCRM of example 1, wherein the computing service request from the UE is received via a radio resource control (RRC) message.

Example 7 includes the one or more NTCRM of any one of examples 1-6, wherein the instructions, when executed, are further to configure the service mesh proxy to: receive, from the SOCF, a first response to the HTTP service request message; and encode, for transmission to the UE, a second response based on the first response.

Example 8 includes the one or more NTCRM of example 7, wherein the first and second responses include an identifier associated with: a communication service function (Comm SF), a computing service function (Comp SF), or a microservice.

Example 9 includes an apparatus to be implemented in a user equipment (UE), the apparatus comprising: a processor circuitry; and a service mesh proxy. The service mesh proxy is to: receive, from the processor circuitry, a first request for a computing service; send, based on the first request, a second request for the computing service to a service orchestration control function (SOCF); and receive, from the SOCF, a response that includes an identifier associated with the requested computing service.

Example 10 includes the apparatus of example 9, wherein the second request for the computing service is sent to the SOCF via an evolved service communication proxy (eSCP).

Example 11 includes the apparatus of example 9, wherein the processor circuitry is further to encode, for transmission to an access and mobility management function (AMF), a registration message, wherein the registration message includes an indication that the UE includes the service mesh proxy.

Example 12 includes the apparatus of example 9, wherein the service mesh proxy is further to receive, from a service infrastructure control function (SICF), configuration information to configure access and traffic management rules, security-related information, or discoverable services.

Example 13 includes the apparatus of example 12, wherein the request from the SICF is received via an access and mobility management function (AMF) as a non-access stratum (NAS) message or as part of UE route selection policy information.

Example 14 includes the apparatus of any one of examples 9-13, wherein the processor circuitry is to run an application, and wherein the service mesh proxy is further to receive, from the application, a service mesh service registration request.

Example 15 includes one or more non-transitory computer-readable media (NTCRM) having instructions, stored thereon, that when executed by one or more processors configure a service orchestration control function (SOCF) to: receive, from a service mesh proxy, a request for a computing service for a user equipment (UE); determine one or more requirements for the computing service based on the request; and send a message to a computing control function (Comp CF) via an evolved service communication proxy (eSCP) to indicate the one or more requirements.

Example 16 includes the one or more NTCRM of example 15, wherein the service mesh proxy is included in an access and mobility management function (AMF).

Example 17 includes the one or more NTCRM of example 15, wherein the service mesh proxy is included in the UE.

Example 18 includes the one or more NTCRM of example 15, wherein the request includes an identifier of the computing service, a UE identifier of the UE, and one or more of: a software version, a data rate, a quality of service, or a latency associated with the requested computing service.

Example 19 includes the one or more NTCRM of any one of examples 15-18, wherein the instructions, when executed, are further to configure the SOCF to send a request to a service infrastructure control function (SICF) via the eSCP to configure a service mesh for the computing service.

Example 20 includes the one or more NTCRM of example 19, wherein the request to the SICF indicates one or more traffic management rules for a user plane eSCP (eSCP-U).

Example 21 includes a method to enable communication between a UE microservice and a network (NW) microservice, wherein the method includes one or more aspects of solution 1 and/or solution 2 below:

Solution 1: service mesh only in network

UE interacts with a service mesh proxy in the cellular network to perform service discovery, computing offloading and negotiate the connectivity.

The service mesh proxy can be part of AMF or CU-CP function

The message flow for communication between microservice on UE and the microservice in NW.

SOCF shall request the configurations of the eSCP-Us to set up the traffic rules such as routing, load balancing, and monitoring specifically, the The registration message includes new indicators for service mesh.

The service request message is in the form of a NAS or RRC message to include the requirements for the microservice requirements as described in operation 2 of FIGS. 2A-2B, which can be used to allocate Comp SF, Comm SF and DSF.

The response for the service request may include the identifiers for the Comp SF, etc.

Comp SF serves as the service mesh ingress/egress gateway for the microservice in the NW SOCF can request the requirements on the service mesh configuration to SICF which configures the related eSCP-Us for traffic management and monitoring as described in operation 5 of FIGS. 2A-2B.

Solution 2: enable UE to participate in the cellular network service mesh with the SM proxy at the UE side UE is part of the cellular network service mesh and holds the functionality of a service mesh proxy by itself. UE communicate with NW CP service mesh via eSCP-C and SBI The general message flow for communication between microservice on UE and the microservice in NW In UE's registration message with AMF, new indicators are present to identify UE's request for CP or UP or microservice as described in operation 2 of FIGS. 4A-4B

AMF sends a request to SICF to configure UE's access and traffic management rules for CP service mesh as described in Operation 3 (a)/(b) of FIGS. 4A-4B

SICF sends configuration requests to eSCP-Cs and UE's SM proxy for access and traffic management rules as described in Operation 4 of FIGS. 4A-4B where the message to UE's SM proxy can be in the form of a NAS message or as UE's URSP SOCF sends a request to SICF to configure the UP service mesh as described in Operation 7 of FIGS. 4A-4B. This message may include the identifiers of the assigned Comp SF, Comm SF and DSF, the traffic management rules for UE's application or microservice, and the identifiers to the requested microservice SICF sends a request to the eSCP-U to configure the UP service mesh as described in Operation 8 of FIGS. 4A-4B. This message may include the identifiers to the eSCP-Us, Comp SF, UE, microservices, the traffic management rules, and the rules for monitoring, statistics, and telemetry.

Example Z01 may include an apparatus comprising means to perform one or more elements of a method described in or related to any of examples 1-21, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-21, or any other method or process described herein.

Example Z03 may include an apparatus comprising logic, modules, or circuitry to perform one or more elements of a method described in or related to any of examples 1-21, or any other method or process described herein.

Example Z04 may include a method, technique, or process as described in or related to any of examples 1-21, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-21, or portions thereof.

Example Z06 may include a signal as described in or related to any of examples 1-21, or portions or parts thereof.

Example Z07 may include a datagram, packet, frame, segment, protocol data unit (PDU), or message as described in or related to any of examples 1-21, or portions or parts thereof, or otherwise described in the present disclosure.

Example Z08 may include a signal encoded with data as described in or related to any of examples 1-21, or portions or parts thereof, or otherwise described in the present disclosure.

Example Z09 may include a signal encoded with a datagram, packet, frame, segment, protocol data unit (PDU), or message as described in or related to any of examples 1-21, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-21, or portions thereof.

Example Z11 may include a computer program comprising instructions, wherein execution of the program by a processing element is to cause the processing element to carry out the method, techniques, or process as described in or related to any of examples 1-21, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

3GPP Third Generation Partnership Project
4G Fourth Generation
5G Fifth Generation
5GC 5G Core network
AC Application Client
ACR Application Context Relocation
ACK Acknowledgement
ACID Application Client Identification
AF Application Function
AM Acknowledged Mode
AMBR Aggregate Maximum Bit Rate
AMF Access and Mobility Management Function
AN Access Network
ANR Automatic Neighbour Relation
AOA Angle of Arrival
AP Application Protocol, Antenna Port, Access Point
API Application Programming Interface
APN Access Point Name
ARP Allocation and Retention Priority
ARQ Automatic Repeat Request
AS Access Stratum
ASP Application Service Provider
ASN.1 Abstract Syntax Notation One
AUSF Authentication Server Function
AWGN Additive White Gaussian Noise
BAP Backhaul Adaptation Protocol
BCH Broadcast Channel
BER Bit Error Ratio
BFD Beam Failure Detection
BLER Block Error Rate
BPSK Binary Phase Shift Keying
BRAS Broadband Remote Access Server
BSS Business Support System
BS Base Station
BSR Buffer Status Report
BW Bandwidth -continued BWP Bandwidth Part
C-RNTI Cell Radio Network Temporary Identity
CA Carrier Aggregation, Certification Authority
CAPEX CAPital EXpenditure
CBRA Contention Based Random Access
CC Component Carrier, Country Code, Cryptographic Checksum
CCA Clear Channel Assessment
CCE Control Channel Element
CCCH Common Control Channel
CE Coverage Enhancement
CDM Content Delivery Network
CDMA Code-Division Multiple Access
CDR Charging Data Request
CDR Charging Data Response
CFRA Contention Free Random Access
CG Cell Group
CGF Charging Gateway Function
CHF Charging Function
CI Cell Identity
CID Cell-ID (e.g., positioning method)
CIM Common Information Model
CIR Carrier to Interference Ratio
CK Cipher Key
CM Connection Management, Conditional Mandatory
CMAS Commercial Mobile Alert Service
CMD Command
CMS Cloud Management System
CO Conditional Optional
CoMP Coordinated Multi-Point
CORESET Control Resource Set
COTS Commercial Off-The-Shelf
CP Control Plane, Cyclic Prefix, Connection Point
CPD Connection Point Descriptor
CPE Customer Premise Equipment
CPICHCommon Pilot Channel
CQI Channel Quality Indicator
CPU CSI processing unit, Central Processing Unit
C/R Command/Response field bit
CRAN Cloud Radio Access Network, Cloud RAN
CRB Common Resource Block
CRC Cyclic Redundancy Check
CRI Channel-State Information Resource Indicator,
CSI-RS Resource Indicator
C-RNTI Cell RNTI
CS Circuit Switched
CSCF call session control function
CSAR Cloud Service Archive
CSI Channel-State Information
CSI-IM CSI Interference Measurement
CSI-RS CSI Reference Signal
CSI-RSRP CSI reference signal received power
CSI-RSRQ CSI reference signal received quality
CSI-SINR CSI signal-to-noise and interference ratio
CSMA Carrier Sense Multiple Access
CSMA/CA CSMA with collision avoidance
CSS Common Search Space, Cell-specific Search Space
CTF Charging Trigger Function
CTS Clear-to-Send
CW Codeword
CWS Contention Window Size
D2D Device-to-Device
DC Dual Connectivity, Direct Current
DCI Downlink Control Information
DF Deployment Flavour
DL Downlink
DMTF Distributed Management Task Force
DPDK Data Plane Development Kit
DM-RS, DMRS Demodulation Reference Signal
DN Data network
DNN Data Network Name
DNAI Data Network Access Identifier
DRB Data Radio Bearer
DRS Discovery Reference Signal
DRX Discontinuous Reception
DSL Domain Specific Language. Digital Subscriber Line
DSLAM DSL Access Multiplexer
DwPTS Downlink Pilot Time Slot
E-LAN Ethernet Local Area Network
E2E End-to-End -continued EAS Edge Application Server
ECCA extended clear channel assessment, extended CCA
ECCE Enhanced Control Channel Element, Enhanced CCE
ED Energy Detection
EDGE Enhanced Datarates for GSM Evolution (GSM Evolution)
EAS Edge Application Server
EASID Edge Application Server Identification
ECS Edge Configuration Server
ECSP Edge Computing Service Provider
EDN Edge Data Network
EEC Edge Enabler Client
EECID Edge Enabler Client Identification
EES Edge Enabler Server
EESID Edge Enabler Server Identification
EHE Edge Hosting Environment
EGMF Exposure Governance Management Function
EGPRS Enhanced GPRS
EIR Equipment Identity Register
eLAA enhanced Licensed Assisted Access, enhanced LAA
EM Element Manager
eMBB Enhanced Mobile Broadband
EMS Element Management System
eNB evolved NodeB, E-UTRAN Node B
EN-DC E-UTRA-NR Dual Connectivity
EPC Evolved Packet Core
EPDCCH enhanced PDCCH, enhanced Physical Downlink Control Cannel
EPRE Energy per resource element
EPS Evolved Packet System
EREG enhanced REG, enhanced resource element groups
ETSI European Telecommunications Standards Institute
ETWS Earthquake and Tsunami Warning System
eUICC embedded UICC, embedded Universal Integrated Circuit Card
E-UTRA Evolved UTRA
E-UTRAN Evolved UTRAN
EV2X Enhanced V2X
F1AP F1 Application Protocol
F1-C F1 Control plane interface
F1-U F1 User plane interface
FACCH Fast Associated Control CHannel
FACCH/F Fast Associated Control Channel/Full rate
FACCH/H Fast Associated Control Channel/Half rate
FACH Forward Access Channel
FAUSCH Fast Uplink Signalling Channel
FB Functional Block
FBI Feedback Information
FCC Federal Communications Commission
FCCH Frequency Correction CHannel
FDD Frequency Division Duplex
FDM Frequency Division Multiplex
FDMAFrequency Division Multiple Access
FE Front End
FEC Forward Error Correction
FFS For Further Study
FFT Fast Fourier Transformation
feLAA further enhanced Licensed Assisted Access, further enhanced LAA
FN Frame Number
FPGA Field-Programmable Gate Array
FR Frequency Range
FQDN Fully Qualified Domain Name
G-RNTI GERAN Radio Network Temporary Identity
GERAN GSM EDGE RAN, GSM EDGE Radio Access Network
GGSN Gateway GPRS Support Node
GLONASS GLObal'naya NAvigatsionnaya Sputnikovaya Sistema
(Engl.: Global Navigation Satellite System)
gNB Next Generation NodeB
gNB-CU gNB-centralized unit, Next Generation NodeB centralized unit
gNB-DU gNB-distributed unit, Next Generation NodeB distributed unit
GNSS Global Navigation Satellite System
GPRS General Packet Radio Service
GPSI Generic Public Subscription Identifier
GSM Global System for Mobile Communications, Groupe Spécial Mobile
GTP GPRS Tunneling Protocol
GTP-UGPRS Tunnelling Protocol for User Plane
GTS Go To Sleep Signal (related to WUS)
GUMMEI Globally Unique MME Identifier
GUTI Globally Unique Temporary UE Identity
HARQ Hybrid ARQ, Hybrid Automatic Repeat Request
HANDO Handover
HFN HyperFrame Number -continued HHO Hard Handover
HLR Home Location Register
HN Home Network
HO Handover
HPLMN Home Public Land Mobile Network
HSDPA High Speed Downlink Packet Access
HSN Hopping Sequence Number
HSPA High Speed Packet Access
HSS Home Subscriber Server
HSUPA High Speed Uplink Packet Access
HTTP Hyper Text Transfer Protocol
HTTPS Hyper Text Transfer Protocol Secure
(https is http/1.1 over SSL, i.e. port 443)
I-Block Information Block
ICCID Integrated Circuit Card Identification
IAB Integrated Access and Backhaul
ICIC Inter-Cell Interference Coordination
ID Identity, identifier
IDFT Inverse Discrete Fourier Transform
IE Information element
IBE In-Band Emission
IEEE Institute of Electrical and Electronics Engineers
IEI Information Element Identifier
IEIDL Information Element Identifier Data Length
IETF Internet Engineering Task Force
IF Infrastructure
IIOT Industrial Internet of Things
IM Interference Measurement, Intermodulation, IP Multimedia
IMC IMS Credentials
IMEI International Mobile Equipment Identity
IMGI International mobile group identity
IMPI IP Multimedia Private Identity
IMPU IP Multimedia PUblic identity
IMS IP Multimedia Subsystem
IMSI International Mobile Subscriber Identity
IoT Internet of Things
IP Internet Protocol
Ipsec IP Security, Internet Protocol Security
IP-CAN IP-Connectivity Access Network
IP-M IP Multicast
IPv4 Internet Protocol Version 4
IPv6 Internet Protocol Version 6
IR Infrared
IS In Sync
IRP Integration Reference Point
ISDN Integrated Services Digital Network
ISIM IM Services Identity Module
ISO International Organisation for Standardisation
ISP Internet Service Provider
IWF Interworking-Function
I-WLAN Interworking WLAN
Constraint length of the convolutional code, USIM Individual key
kB Kilobyte (1000 bytes)
kbps kilo-bits per second
Kc Ciphering key
Ki Individual subscriber authentication key
KPI Key Performance Indicator
KQI Key Quality Indicator
KSI Key Set Identifier
ksps kilo-symbols per second
KVM Kernel Virtual Machine
L1 Layer 1 (physical layer)
L1-RSRP Layer 1 reference signal received power
L2 Layer 2 (data link layer)
L3 Layer 3 (network layer)
LAA Licensed Assisted Access
LAN Local Area Network
LADN Local Area Data Network
LBT Listen Before Talk
LCM LifeCycle Management
LCR Low Chip Rate
LCS Location Services
LCID Logical Channel ID
LI Layer Indicator
LLC Logical Link Control, Low Layer Compatibility
LMF Location Management Function
LOS Line of Sight
LPLMN Local PLMN
LPP LTE Positioning Protocol -continued LSB Least Significant Bit
LTE Long Term Evolution
LWA LTE-WLAN aggregation
LWIP LTE/WLAN Radio Level Integration with IPsec Tunnel
LTE Long Term Evolution
M2M Machine-to-Machine
MAC Medium Access Control (protocol layering context)
MAC Message authentication code (security/encryption context)
MAC-A MAC used for authentication and key agreement
(TSG T WG3 context)
MAC-I MAC used for data integrity of signalling messages
(TSG T WG3 context)
MANO Management and Orchestration
MBMS Multimedia Broadcast and Multicast Service
MBSFN Multimedia Broadcast multicast service
Single Frequency Network
MCC Mobile Country Code
MCG Master Cell Group
MCOT Maximum Channel Occupancy Time
MCS Modulation and coding scheme
MDAF Management Data Analytics Function
MDAS Management Data Analytics Service
MDT Minimization of Drive Tests
ME Mobile Equipment
MeNB master eNB
MER Message Error Ratio
MGL Measurement Gap Length
MGRP Measurement Gap Repetition Period
MIB Master Information Block, Management Information Base
MIMO Multiple Input Multiple Output
MLC Mobile Location Centre
MM Mobility Management
MME Mobility Management Entity
MN Master Node
MNO Mobile Network Operator
MO Measurement Object, Mobile Originated
MPBCH MTC Physical Broadcast CHannel
MPDCCH MTC Physical Downlink Control CHannel
MPDSCH MTC Physical Downlink Shared CHannel
MPRACH MTC Physical Random Access CHannel
MPUSCH MTC Physical Uplink Shared Channel
MPLS MultiProtocol Label Switching
MS Mobile Station
MSB Most Significant Bit
MSC Mobile Switching Centre
MSI Minimum System Information,
MCH Scheduling Information
MSID Mobile Station Identifier
MSIN Mobile Station Identification Number
MSISDN Mobile Subscriber ISDN Number
MT Mobile Terminated, Mobile Termination
MTC Machine-Type Communications
mMTC massive MTC, massive Machine-Type Communications
MU-MIMO Multi User MIMO
MWUS MTC wake-up signal, MTC WUS
NACK Negative Acknowledgement
NAI Network Access Identifier
NAS Non-Access Stratum, Non- Access Stratum layer
NCT Network Connectivity Topology
NC-JT Non-Coherent Joint Transmission
NEC Network Capability Exposure
NE-DC NR-E-UTRA Dual Connectivity
NEF Network Exposure Function
NF Network Function
NFP Network Forwarding Path
NFPD Network Forwarding Path Descriptor
NFV Network Functions Virtualization
NFVI NFV Infrastructure
NFVO NFV Orchestrator
NG Next Generation, Next Gen
NGEN-DC NG-RAN E-UTRA-NR Dual Connectivity
NM Network Manager
NMS Network Management System
N-PoP Network Point of Presence
NMIB, N-MIB Narrowband MIB
NPBCH Narrowband Physical Broadcast CHannel
NPDCCH Narrowband Physical Downlink Control CHannel
NPDSCH Narrowband Physical Downlink Shared CHannel
NPRACH Narrowband Physical Random Access CHannel NPUSCH Narrowband Physical Uplink Shared CHannel
NPSS Narrowband Primary Synchronization Signal
NSSS Narrowband Secondary Synchronization Signal
NR New Radio, Neighbour Relation
NRF NF Repository Function
NRS Narrowband Reference Signal
NS Network Service
NSA Non-Standalone operation mode
NSD Network Service Descriptor
NSR Network Service Record
NSSAINetwork Slice Selection Assistance Information
S-NNSAI Single-NSSAI
NSSF Network Slice Selection Function
NW Network
NWUSNarrowband wake-up signal, Narrowband WUS
NZP Non-Zero Power
O&M Operation and Maintenance
ODU2 Optical channel Data Unit - type 2
OFDMOrthogonal Frequency Division Multiplexing
OFDMA Orthogonal Frequency Division Multiple Access
OOB Out-of-Band
OOS Out of Sync
OPEX OPerating EXpense
OSI Other System Information
OSS Operations Support System
OTA over-the-air
PAPR Peak-to-Average Power Ratio
PAR Peak to Average Ratio
PBCH Physical Broadcast Channel
PC Power Control, Personal Computer
PCC Primary Component Carrier, Primary CC
P-CSCF Proxy CSCF
PCell Primary Cell
PCI Physical Cell ID, Physical Cell Identity
PCEF Policy and Charging Enforcement Function
PCF Policy Control Function
PCRF Policy Control and Charging Rules Function
PDCP Packet Data Convergence Protocol,
Packet Data Convergence Protocol layer
PDCCH Physical Downlink Control Channel
PDCP Packet Data Convergence Protocol
PDN Packet Data Network, Public Data Network
PDSCH Physical Downlink Shared Channel
PDU Protocol Data Unit
PEI Permanent Equipment Identifiers
PFD Packet Flow Description
P-GW PDN Gateway
PHICH Physical hybrid-ARQ indicator channel
PHY Physical layer
PLMN Public Land Mobile Network
PIN Personal Identification Number
PM Performance Measurement
PMI Precoding Matrix Indicator
PNF Physical Network Function
PNFD Physical Network Function Descriptor
PNFR Physical Network Function Record
POC PTT over Cellular
PP, PTP Point-to-Point
PPP Point-to-Point Protocol
PRACH Physical RACH
PRB Physical resource block
PRG Physical resource block group
ProSe Proximity Services, Proximity-Based Service
PRS Positioning Reference Signal
PRR Packet Reception Radio
PS Packet Services
PSBCH Physical Sidelink Broadcast Channel
PSDCH Physical Sidelink Downlink Channel
PSCCH Physical Sidelink Control Channel
PSSCH Physical Sidelink Shared Channel
PSCell Primary SCell
PSS Primary Synchronization Signal
PSTN Public Switched Telephone Network
PT-RS Phase-tracking reference signal
PTT Push-to-Talk
PUCCH Physical Uplink Control Channel
PUSCH Physical Uplink Shared Channel
QAM Quadrature Amplitude Modulation
QCI QoS class of identifier QCL Quasi co-location
QFI QoS Flow ID, QoS Flow Identifier
QoS Quality of Service
QPSK Quadrature (Quarternary) Phase Shift Keying
QZSS Quasi-Zenith Satellite System
RA-RNTI Random Access RNTI
RAB Radio Access Bearer, Random Access Burst
RACH Random Access Channel
RADIUS Remote Authentication Dial In User Service
RAN Radio Access Network
RAND RANDom number (used for authentication)
RAR Random Access Response
RAT Radio Access Technology
RAU Routing Area Update
RB Resource block, Radio Bearer
RBG Resource block group
REG Resource Element Group
Rel Release
REQ REQuest
RF Radio Frequency
RI Rank Indicator
RIV Resource indicator value
RL Radio Link
RLC Radio Link Control, Radio Link Control layer
RLC AM RLC Acknowledged Mode
RLC UM RLC Unacknowledged Mode
RLF Radio Link Failure
RLM Radio Link Monitoring
RLM-RS Reference Signal for RLM
RM Registration Management
RMC Reference Measurement Channel
RMSI Remaining MSI, Remaining Minimum System Information
RN Relay Node
RNC Radio Network Controller
RNL Radio Network Layer
RNTI Radio Network Temporary Identifier
ROHC RObust Header Compression
RRC Radio Resource Control, Radio Resource Control layer
RRM Radio Resource Management
RS Reference Signal
RSRP Reference Signal Received Power
RSRQ Reference Signal Received Quality
RSSI Received Signal Strength Indicator
RSU Road Side Unit
RSTD Reference Signal Time difference
RTP Real Time Protocol
RTS Ready-To-Send
RTT Round Trip Time
Rx Reception, Receiving, Receiver
S1AP S1 Application Protocol
S1-MME S1 for the control plane
S1-U S1 for the user plane
S-CSCF serving CSCF
S-GW Serving Gateway
S-RNTI SRNC Radio Network Temporary Identity
S-TMSI SAE Temporary Mobile Station Identifier
SA Standalone operation mode
SAE System Architecture Evolution
SAP Service Access Point
SAPD Service Access Point Descriptor
SAPI Service Access Point Identifier
SCC Secondary Component Carrier, Secondary CC
SCell Secondary Cell
SCEF Service Capability Exposure Function
SC-FDMA Single Carrier Frequency Division Multiple Access
SCG Secondary Cell Group
SCM Security Context Management
SCS Subcarrier Spacing
SCTP Stream Control Transmission Protocol
SDAP Service Data Adaptation Protocol,
Service Data Adaptation Protocol layer
SDL Supplementary Downlink
SDNF Structured Data Storage Network Function
SDP Session Description Protocol
SDSF Structured Data Storage Function
SDT Small Data Transmission
SDU Service Data Unit
SEAF Security Anchor Function
SeNB secondary eNB -continued SEPP Security Edge Protection Proxy
SFI Slot format indication
SFTD Space-Frequency Time Diversity, SFN and frame timing difference
SFN System Frame Number
SgNB secondary gNB
SGSN Serving GPRS Support Node
S-GW Serving Gateway
SI System Information
SI-RNTI System Information RNTI
SIB System Information Block
SIM Subscriber Identity Module
SIP Session Initiated Protocol
SiP System in Package
SL Sidelink
SLA Service Level Agreement
SM Session Management
SMF Session Management Function
SMS Short Message Service
SMSF SMS Function
SMTC SSB-based Measurement Timing Configuration
SN Secondary Node, Sequence Number
SoC System on Chip
SON Self-Organizing Network
SpCell Special Cell
SP-CSI-RNTI Semi-Persistent CSI RNTI
SPS Semi-Persistent Scheduling
SQN Sequence number
SR Scheduling Request
SRB Signalling Radio Bearer
SRS Sounding Reference Signal
SS Synchronization Signal
SSB Synchronization Signal Block
SSID Service Set Identifier
SS/PBCH Block SSBRI SS/PBCH Block Resource Indicator,
Synchronization Signal Block Resource Indicator
SSC Session and Service Continuity
SS-RSRP Synchronization Signal based Reference Signal
Received Power
SS-RSRQ Synchronization Signal based Reference Signal
Received Quality
SS-SINR Synchronization Signal based Signal to Noise
and Interference Ratio
SSS Secondary Synchronization Signal
SSSG Search Space Set Group
SSSIF Search Space Set Indicator
SST Slice/Service Types
SU-MIMO Single User MIMO
SUL Supplementary Uplink
TA Timing Advance, Tracking Area
TAC Tracking Area Code
TAG Timing Advance Group
TAI Tracking Area Identity
TAU Tracking Area Update
TB Transport Block
TBS Transport Block Size
TBD To Be Defined
TCI Transmission Configuration Indicator
TCP Transmission Communication Protocol
TDD Time Division Duplex
TDM Time Division Multiplexing
TDMA Time Division Multiple Access
TE Terminal Equipment
TEID Tunnel End Point Identifier
TFT Traffic Flow Template
TMSI Temporary Mobile Subscriber Identity
TNL Transport Network Layer
TPC Transmit Power Control
TPMI Transmitted Precoding Matrix Indicator
TR Technical Report
TRP, TRxP Transmission Reception Point
TRS Tracking Reference Signal
TRx Transceiver
TS Technical Specifications, Technical Standard
TTI Transmission Time Interval
Tx Transmission, Transmitting, Transmitter
U-RNTI UTRAN Radio Network Temporary Identity
UART Universal Asynchronous Receiver and Transmitter
UCI Uplink Control Information
UE User Equipment -continued UDM Unified Data Management
UDP User Datagram Protocol
USDF Unstructured Data Storage Network Function
UICC Universal Integrated Circuit Card
UL Uplink
UM Unacknowledged Mode
UML Unified Modelling Language
UMTS Universal Mobile Telecommunications System
UP User Plane
UPF User Plane Function
URI Uniform Resource Identifier
URL Uniform Resource Locator
URLLC Ultra-Reliable and Low Latency
USB Universal Serial Bus
USIM Universal Subscriber Identity Module
USS UE-Specific search space
UTRA UMTS Terrestrial Radio Access
UTRAN Universal Terrestrial Radio Access Network
UwPTS Uplink Pilot Time Slot
V1I Vehicle-to-Infrastruction
V2P Vehicle-to-Pedestrian
V2V Vehicle-to-Vehicle
V2X Vehicle-to-everything
VIM Virtualized Infrastructure Manager
VL Virtual Link,
VLAN Virtual LAN, Virtual Local Area Network
VM Virtual Machine
VNF Virtualized Network Function
VNFFG VNF Forwarding Graph
VNFFGD VNF Forwarding Graph Descriptor
VNFM VNF Manager
VoIP Voice-over-IP, Voice-over- Internet Protocol
VPLMN Visited Public Land Mobile Network
VPN Virtual Private Network
VRB Virtual Resource Block
WiMAX Worldwide Interoperability for Microwave Access
WLANWireless Local Area Network
WMAN Wireless Metropolitan Area Network
WPANWireless Personal Area Network
X2-C X2-Control plane
X2-U X2-User plane
XML eXtensible Markup Language
XRES EXpected user REsponse
XOR eXclusive OR
ZC Zadoff-Chu
ZP Zero Power

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. One or more non-transitory computer-readable media (NTCRM) having instructions, stored thereon, that when executed by a service mesh proxy, configure the service mesh proxy to:
   receive a computing service request from a user equipment (UE), the computing service request including an indication of a service mesh container or information element (IE); and
   encode a hypertext transfer protocol (HTTP) computing service request message for transmission to a service orchestration control function (SOCF) based on the computing service request from the UE.

2. The one or more NTCRM of claim 1, wherein the HTTP computing service request message includes an indication of: a computing resource requirement, a software version, a data rate, a quality-of-service (QOS) parameter, or a latency.

3. The one or more NTCRM of claim 1, wherein the service mesh proxy is implemented by an access and mobility management function (AMF).

4. The one or more NTCRM of claim 3, wherein the computing service request from the UE is received via a non-access stratum (NAS) message.

5. The one or more NTCRM of claim 1, wherein the service mesh proxy is implemented by centralized unit-control plane (CU-CP).

6. The one or more NTCRM of claim 1, wherein the computing service request from the UE is received via a radio resource control (RRC) message.

7. The one or more NTCRM of claim 1, wherein the instructions, when executed, are further to configure the service mesh proxy to:
   receive, from the SOCF, a first response to the HTTP computing service request message; and
   encode, for transmission to the UE, a second response based on the first response.

8. The one or more NTCRM of claim 7, wherein the first and second responses include an identifier associated with: a communication service function (Comm SF), a computing service function (Comp SF), or a microservice.

9. An apparatus to be implemented in a user equipment (UE), the apparatus comprising:
   a processor circuitry; and
   a service mesh proxy to:
      receive, from the processor circuitry, a first request for a computing service;
      send, based on the first request, a second request for the computing service to a service orchestration control function (SOCF); and
      receive, from the SOCF, a response that includes an identifier associated with the requested computing service.

10. The apparatus of claim 9, wherein the second request for the computing service is sent to the SOCF via an evolved service communication proxy (eSCP).

11. The apparatus of claim 9, wherein the processor circuitry is further to encode, for transmission to an access and mobility management function (AMF), a registration message, wherein the registration message includes an indication that the UE includes the service mesh proxy.

12. The apparatus of claim 9, wherein the service mesh proxy is further to receive, from a service infrastructure control function (SICF), configuration information to configure access and traffic management rules, security-related information, or discoverable services.

13. The apparatus of claim 12, wherein the configuration information from the SICF is received via an access and mobility management function (AMF) as a non-access stratum (NAS) message or as part of UE route selection policy information.

14. The apparatus of claim 9, wherein the processor circuitry is to run an application, and wherein the service mesh proxy is further to receive, from the application, a service mesh service registration request.

15. One or more non-transitory computer-readable media (NTCRM) having instructions, stored thereon, that when executed by one or more processors configure a service orchestration control function (SOCF) to:
   receive, from a service mesh proxy, a request for a computing service for a user equipment (UE);
   determine one or more requirements for the computing service based on the request; and
   send a message to a computing control function (Comp CF) via an evolved service communication proxy (eSCP) to indicate the one or more requirements.

16. The one or more NTCRM of claim 15, wherein the service mesh proxy is included in an access and mobility management function (AMF).

17. The one or more NTCRM of claim 15, wherein the service mesh proxy is included in the UE.

18. The one or more NTCRM of claim 15, wherein the request includes an identifier of the computing service, a UE identifier of the UE, and one or more of: a software version, a data rate, a quality of service, or a latency associated with the requested computing service.

19. The one or more NTCRM of claim 15, wherein the instructions, when executed, are further to configure the SOCF to send a request to a service infrastructure control function (SICF) via the eSCP to configure a service mesh for the computing service.

20. The one or more NTCRM of claim 19, wherein the request to the SICF indicates one or more traffic management rules for a user plane eSCP (eSCP-U).

* * * * *